US009608848B2

(12) United States Patent
Roy et al.

(10) Patent No.: US 9,608,848 B2
(45) Date of Patent: Mar. 28, 2017

(54) COMMUNICATING THROUGH PHYSICAL VIBRATION

(71) Applicant: The Board of Trustees of the University of Illinois, Urbana, IL (US)

(72) Inventors: Nirupam Roy, Urbana, IL (US); Romit Roy Choudhury, Champaign, IL (US); Mahanth K. Gowda, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 14/920,079

(22) Filed: Oct. 22, 2015

(65) Prior Publication Data

US 2016/0119168 A1 Apr. 28, 2016

Related U.S. Application Data

(60) Provisional application No. 62/067,176, filed on Oct. 22, 2014.

(51) Int. Cl.
*H03K 7/08* (2006.01)
*H04L 25/49* (2006.01)
*H04B 1/04* (2006.01)

(52) U.S. Cl.
CPC ........... *H04L 25/4902* (2013.01); *H04B 1/04* (2013.01)

(58) Field of Classification Search
CPC .................................................. H04L 25/4902
USPC ........................................................ 375/238
See application file for complete search history.

(56) References Cited

U.S. PATENT DOCUMENTS

| 4,210,826 A | * | 7/1980 | Baker | .................... | H03K 17/10 327/412 |
| 4,514,771 A | * | 4/1985 | Stark | ...................... | G11B 5/012 360/73.03 |
| 5,113,859 A | | 5/1992 | Funke | | |

(Continued)

FOREIGN PATENT DOCUMENTS

JP 2012205294 A 10/2012

OTHER PUBLICATIONS

"What is Arduino," 7 pgs., 2015, accessed at https://arduino.cc/ on Oct. 29, 2015.

(Continued)

*Primary Examiner* — Lihong Yu
(74) *Attorney, Agent, or Firm* — Lowenstein Sandler LLP

(57) ABSTRACT

A data transmitter includes a vibration motor and a switch to regulate voltage from a direct-current (DC) power supply to the vibration motor. A microcontroller generates a pulse width modulation signal with which to drive the switch and regulate the voltage to the vibration motor in a sinusoidal manner, to generate data as symbols from vibrations that form a series of bits from the vibration motor. The microcontroller may also cancel and jam a sound of vibration (SoV) created by the vibration motor. A data receiver includes a vibration sensor to sample data from vibrations in an incoming signal at a predetermined sampling rate, and a microcontroller, coupled to the vibration sensor, to control the sampling rate through an inter-integrated circuit (I2C) protocol or the like. A memory card, coupled to the microcontroller, stores the data with a serial peripheral interface (SPI) protocol or the like.

18 Claims, 16 Drawing Sheets

(56) References Cited

U.S. PATENT DOCUMENTS

| | | | | |
|---|---|---|---|---|
| 5,140,640 A | * | 8/1992 | Graupe et al. | G10K 11/1782 381/71.12 |
| 6,388,417 B1 | * | 5/2002 | Keith | H02P 25/092 318/638 |
| 2002/0126857 A1 | * | 9/2002 | Hile | H04R 3/00 381/98 |
| 2009/0097455 A1 | * | 4/2009 | Hoffmann | H04B 1/707 370/335 |
| 2011/0252178 A1 | | 10/2011 | Wang et al. | |

OTHER PUBLICATIONS

"8-bit AVR® Microcontroller with 4/8/16/32K Bytes in-System Programmable Flash," ATMEL®, Rev.8161D-AVR-10/09, pp. 1-448 (Oct. 2009).

"Audible Noise Reduction," Whitepaper, Danfoss, 4 pgs. (Jan. 2011).

"Welcome to CyanogenMod," Android Community Operating System, 1 pg., accessed at https://cyanogenmod.org/ on Oct. 29, 2015.

Barr, Michael, "Pulse Width Modulation," Embedded Systems Programming, pp. 103-104 (Sep. 2001).

Roberts, Doug, "Reducing Audible Noise in Vibration Motors," 4 pgs. (Aug. 15, 2013), accessed at http://www.precisionmicrodrives.com/tech-blog/2013/08/15/reducing-audible-noise-in-vibration-motors on Oct. 29, 2015.

Kim, Peter, "Android, High-Performance Audio in 4.1, and What it Means—Plus libpd Goodness, Today," Android, High-Performance Audio in 4.1, and What it Means—Plus libpd Goodness, Today—Create Digital, 7 pgs., accessed at http://createdigitalmusic.com/2012/07/android-high-performance-audio-in-4-1-and-what-it-means-plus-lib on Oct. 29, 2015.

"Samsung Galaxy S4 Teardown," 15 pgs., accessed at https://www.ifixit.com/Teardown/Samsung+Galaxy+S4+Teardown/13947 on Oct. 29, 2015.

Brauer, John R., "Magnetic Actuators and Sensors," 1 pg., accessed at https://books.google.com/books/about/Magnetic_Actuators_and_Sensors.html?id=ggaaAgAAQBAJ&source on Oct. 29, 2015.

Brown, Tim W.C., et al., "Evaluating the Eavesdropping Range of Varying Magnetic Field Strengths in NFC Standards," IEEE 7th European Conference on Antennas and Propagation (EuCAP), pp. 3525-3528 (2013).

"Digital Accelerometer," Data Sheet for ADXL345, Analog Devices, 40 pgs (2009).

Dey, Sanorita, et al., "Accelprint: Imperfections of Accelerometers Make Smartphones Trackable," Proceedings of the Network and Distributed System Security Symposium (NDSS) (2014).

Dhananjay, Aditya, et al., "Hermes: Data Transmission over Unknown Voice channels," Proceedings of the Sixteenth Annual International Conference on Mobile Computing and Networking, pp. 113-124 (2010).

Diakos, Thomas P., et al. "Eavesdropping Near-Field Contactless Payments: a Quantitative Analysis," The Journal of Engineering (2013).

Eun, Hasoo, et al., "Conditional Privacy Preserving Security Protocol for NFC Applications," IEEE Transactions on Consumer Electronics, vol. 59, No. 1, pp. 153-160 (2013).

Feygin, David, et al., "Haptic Guidance: Experimental Evaluation of a Haptic Training Method for a Perceptual Motor Skill," In Haptic Interfaces for Virtual Environment and Teleoperator Systems, IEEE, pp. 40-47 (2002).

Giri, Manish, et al., "Theoretical Analysis of User Authentication Systems," International Journal of Innovative Research and Development 2, No. 12 (2013).

Haselsteiner, Ernst, et al., "Security in Near Field Communication (NFC)," Workshop on RFID Security RFIDSec, pp. 1-11 (2006).

Hendershot, J. "Causes and Sources of Audible Noise in Electrical Motors," 22nd Proceedings on Incremental Motion Control Systems and Devices Symposium, pp. 259-270 (1993).

Huang, Kevin, et al., "PianoTouch: A Wearable Haptic Piano Instruction System for Passive Learning of Piano Skills," in 12th IEEE International Symposium on Wearable Computers, pp. 41-44 (2008).

Hwang, Inhwan, et al., "Privacy-Aware Communication for Smartphones Using Vibration," IEEE 18th International Conference on Embedded and Real-Time Computing Systems and Applications (RTCSA), pp. 447-452 (2012).

Kaajakari, Ville, "Practical MEMS: Design of Microsystems, Accelerometers, Gyroscopes, RF MEMS, Optical MEMS, and Microfluidic systems," Las Vegas, NV, Small Gear Publishing, pp. 1-3 (Mar. 17, 2009).

Marquardt, Philip, et al., "(sp) iPhone: Decoding Vibrations from Nearby Keyboards using Mobile Phone Accelerometers," Proceedings of the 18th ACM Conference on Computer and Communications Security, pp. 551-562 (2011).

Miluzzo, Emiliano, et al., "Tapprints: Your Finger Taps Have Fingerprints," Proceedings of the 10th International conference on Mobile Systems, Applications, and Services, AMC, pp. 323-336 (Jun. 25-29, 2012).

Morris, Dan, et al., "Haptic Feedback Enhances Force Skill Learning," IEEE Second Joint EuroHaptics Conference anbd Symposium on Haptic Interfaces for Virtual Environment and Teleoperator Systems (WHC'07) pp. 21-26 (2007).

Mulliner, Collin, "Vulnerability Analysis and Attacks on NFC-Enabled Mobile Phones," IEEE International Conference on Availability, Reliability and Security, pp. 695-700 (2009).

Nandakumar, Rajalakshmi, et al., "Dhwani: Secure Peer-to-Peer Acoustic NFC," In ACM SIGCOMM Computer Communication Review, vol. 43, No. 4, pp. 63-74 (2013).

Niwa, Masataka, et al., "Vibrotactile Apparent Movement by DC motors and Voice-Coil Tactors," Proceedings of the 14th International Conference on Artificial Reality and Telexistence (ICAT), pp. 126-131 (2004).

Semiconductor, Philips, "THE I 2C-Bus Specification Version 2.1," pp. 1-46 (2000).

Studer, Ahren, et al., "Don't Bump, Shake on it: The Exploitation of a Popular Accelerometer-Based Smart Phone Exchange and its Secure Replacement," Proceedings of the 27th Annual Computer Security Applications Conference, pp. 333-342 (2011).

Widnall, S., "Lecture L19-Vibration, Normal Modes, Natural Frequencies, Instability," Dynamics (2009).

Yonezawa, Takuro, et al., "Vib-Connect: A Device Collaboration Interface using Vibration," In Embedded and Real-Time Computing Systems and Applications (RTCSA), IEEE 17th International Conference on, vol. 1, pp. 121-125 (2011).

I2C, Wikipedia, the free encyclopedia, download available via web page at https://en.wikipedia.org/wiki/I%C2%B2C, downloaded Sep. 18, 2015.

Zhong, Lin, et al., "OsteoConduct: Wireless Body-Area Communication Based on Bone Conduction," Proceedings of the ICST 2nd International Conference on Body Area Networks, p. 9. ICST (Institute for Computer Sciences, Social-Informatics and Telecommunications Engineering) (2007).

Mohamed, Tamer et al., "TeethClick: Input with Teeth Clacks," pp. 1-4 (2007).

Brady, David et al., "Underwater Acoustic Communications," Wireless Communications: Signal Processing Perspectives 8, pp. 330-379 (1998).

"ANSS-Advanced National Seismic System," USGS Earthquake Hazards Program, 3 pgs., accessed at http://earthquake.usgs.gov/monitoring/anss/ on Jan. 20, 2016.

* cited by examiner

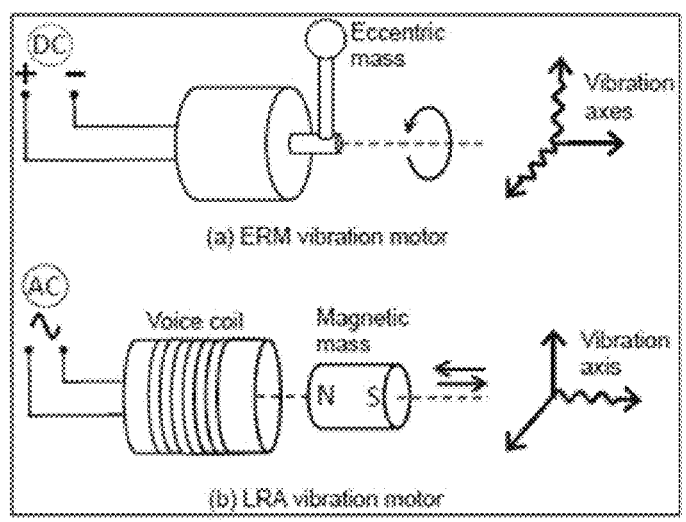
FIG. 1A
FIG. 1B
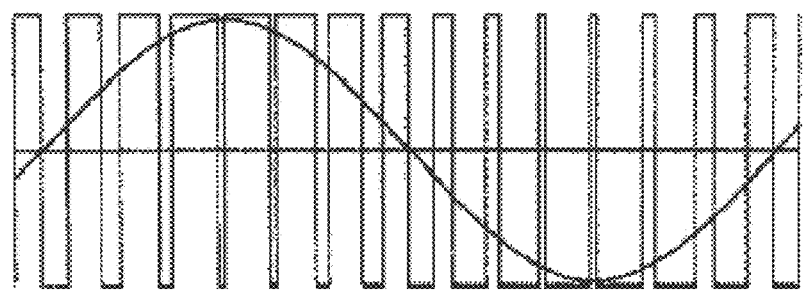
FIG. 2

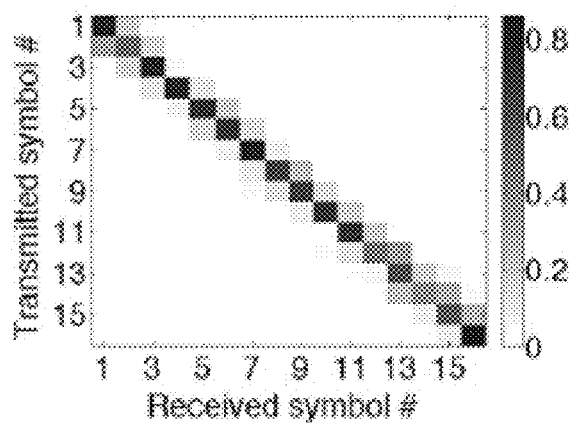
*FIG. 21A*
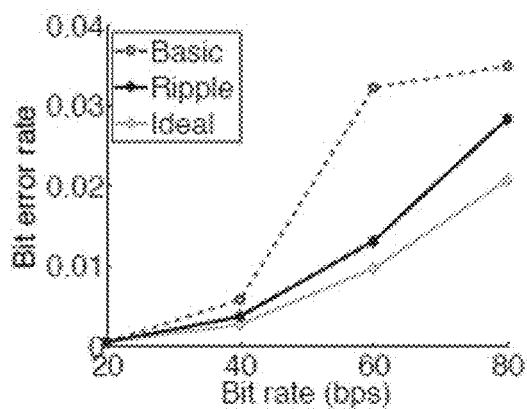
*FIG. 21B*
*FIG. 21C*
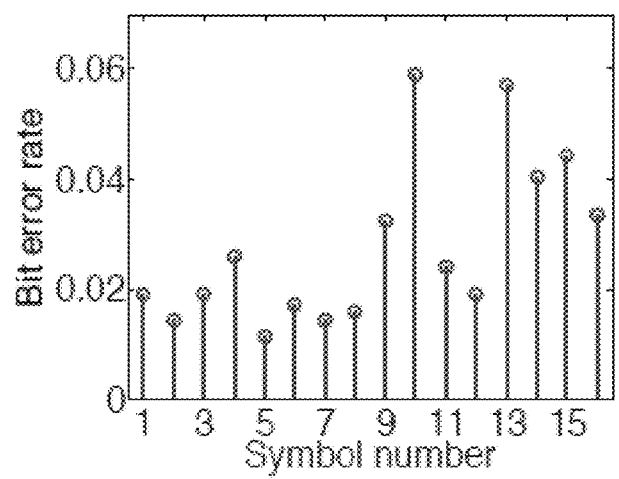

COMMUNICATING THROUGH PHYSICAL VIBRATION

REFERENCE TO EARLIER FILED APPLICATION

This application claims the benefit under 35 U.S.C. §119(e) of U.S. Provisional Patent Application No. 62/067,176, filed Oct. 22, 2014, which is incorporated herein, in its entirety, by this reference.

TECHNICAL FIELD

The present disclosure relates to communicating through physical vibration.

BACKGROUND

Various near field communication technologies exist today, some of which employ radio frequency (RF) modalities, including near field communication (NFC), infrared, Bluetooth® of Bluetooth Sig, Inc. and WiFi® of the WiFi® Alliance. These technologies, however, are known to suffer from security concerns in being susceptible to interception out of the air if within signal range.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 1A is a diagram of an example eccentric rotating mass (ERM) motor according to an embodiment of the present disclosure.

FIG. 1B is a diagram of an example linear resonant actuator (LRA) motor according to an embodiment of the present disclosure.

FIG. 2 is an example pulse width modulated (PWM) approximation of a sine wave.

FIG. 21A is a graph of an example heat map that shows a confusion matrix of transmitted and received symbols.

FIG. 21B is a graph of an example BER according to an embodiment of the present disclosure when compared to a basic BER and an ideal BER.

FIG. 21C is a graph of a per-symbol BER with a 16-way array.

DETAILED DESCRIPTION

Figure 3:
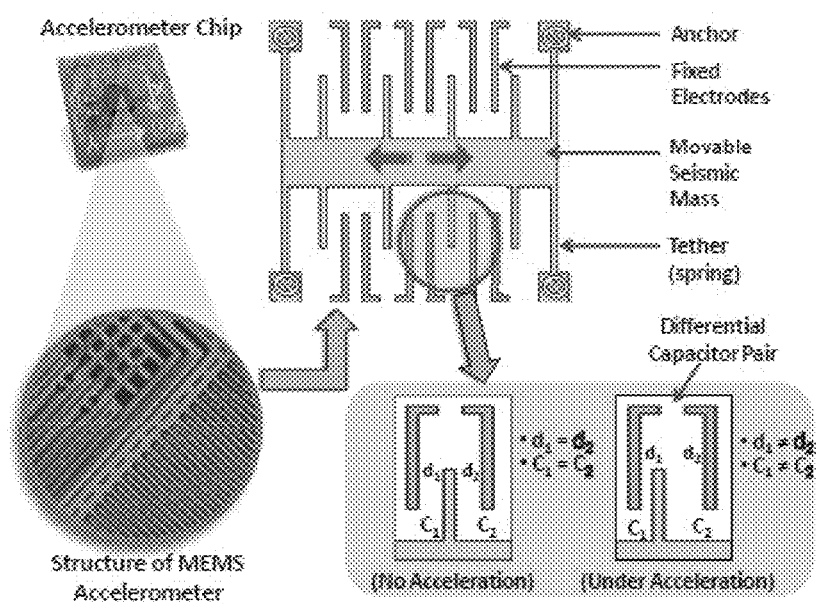
FIG. 3 includes a picture and diagram of an example accelerometer chip according to an embodiment of the present disclosure.

By way of introduction, the present disclosure relates to communicating through vibration between, for example, two electronic devices. In one embodiment, a data transmitter includes a vibration motor and a switch to regulate voltage from a direct-current (DC) power supply to the vibration motor. A microcontroller generates a pulse width modulation (PWM) signal with which to drive the switch and regulate the voltage to the vibration motor in a sinusoidal manner, to generate data as symbols from vibrations that form a series of bits from the vibration motor.

In one embodiment, a data receiver includes a vibration sensor that samples data from vibrations in an incoming signal at a predetermined sampling rate. The incoming signal may be received from direct physical contact with a data transmitter or through physical contact with a physical channel (such as a table top) with which the data transmitter also has physical contact. A microcontroller, coupled to the vibration sensor, controls the sampling rate through an inter-integrated circuit (I2C) protocol. A memory card, coupled to the microcontroller, stores the data with a serial peripheral interface (SPI) protocol. By using a vibration motor to transmit data through symbols and a vibration sensor (such as an accelerometer or a gyroscope) to capture the transmitted data, security can be greatly enhanced.

In another embodiment, a data transmitter includes a vibration motor and a switch to regulate voltage from a DC power supply to the vibration motor. A microcontroller generates a PWM signal with which to drive the switch and regulate the voltage to the vibration motor in a sinusoidal manner, to generate data as symbols from vibrations that form a series of bits from the vibration motor. The symbols cause the vibration motor to emanate a sound of vibration (SoV) that includes data leakage, and wherein the microcontroller is further to generate an anti-noise signal to at least partially cancel the SoV when the SoV emanates. A microphone detects the SoVs and a speaker outputs the anti-noise signal.

Data communication has been studied over a wide range of modalities, including radio frequency (RF), acoustic, visible light, and the like. The present application envisions vibration as a new mode of communication. We explore the using vibration motors present in all cell phones today as a transmitter, while accelerometers, also popular in mobile devices, as a receiver. By carefully regulating the vibrations at the transmitter, and sensing them through accelerometers, two mobile devices may communicate via physical touch or through vibrations through a physical media.

The benefits of using vibration motors and accelerometers in mobile phones as an opportunity to exchange information includes security and zero-configuration, meaning that the two devices need not discover each other's addresses to communicate. The act of physical contact serves as the implicit address. However, some have identified the drawbacks of such a system to be low bit rates (about 5 bits/s), based on the "Morse-code" style of ON/OFF communication with vibrations. Still, researchers conceived creative applications, including secure smartphone pairing and keyless access control.

The present disclosure is aimed at improving the data rates of vibratory communication, as well as its security features. A system disclosed herein breaks away from the intuitive Morse-code style ON/OFF pulses and engages techniques such as orthogonal multi-carrier modulation, gray coding, adaptive calibration, vibration braking, side-channel suppression, and the like. Unique challenges (and opportunities) emerge from the vibration motor and vibration sensor platform, as well as from solid-materials on which they rest. For example, the motor and the materials exhibit resonant frequencies that need to be adaptively suppressed. Vibration sensors such as accelerometers or gyroscopes sense vibration along three orthogonal axes, offering the opportunity to use them as parallel channels, with some degree of leakage. In addition to such techniques, the inventors have also designed a receiver cradle, or a wooden cantilever structure, that amplifies or dampens the vibrations in a desired way. A vibration-based product in the future, say a point-of-sale equipment for credit card transactions, may benefit from such a design.

From a security perspective, the present system recognizes the threat of acoustic leakage due to vibration, e.g., an eavesdropper listening to the sound of vibration and decoding the transmitted bits. To thwart such side channel attacks, the present design adapts the receiver to detect the sounds and adaptively generate a synchronized acoustic signal that cancels the sound. The receiver may also superimpose a jamming sequence, ultimately offering an information-theoretic protection from acoustic eavesdroppers. We observe that application layer securities may not apply in all such scenarios. For example, public and symmetric key-based encryption infrastructure may not scale to billions of phones and other use-cases such as internet of things (IoT). Blocking access to the signal, at the physical layer itself, is desirable in these spontaneous, peer-to-peer, and perhaps disconnected, situations.

It is natural to wonder what kind of applications will use vibratory communication, especially in light of NFC. Bringing the vibratory bit rates to a respectable level—say credit card transactions in a second—may trigger many new use-cases. In particular, strict security-sensitive applications, or applications in the developing world, may be candidates. This is because vibration may be inherently more secure than RF broadcast in NFC or Bluetooth®. Despite the very short communication range in NFC, recent results confirm that security threats are real. Some have decoded NFC transmissions from one meter away and conjecture that high-gain beamforming antennas can further increase the separation. The level of security has been increased with the disclosed acoustic cancellation and jamming.

Moreover, the ubiquity of vibration motors in every cell phone, even in developing regions, presents an immediate market for vibratory communication. Peer-to-peer money exchange with recorded logs is a global problem, recently recognized by the Gates Foundation, and hidden camera attacks on Automated Teller Machine (ATM) kiosks have been rampant in many parts of India and south Asia. Paying local cab drivers with phone vibrations, or using phones as ATM cards can perhaps be of interest in developing countries. Finally, if link capacity proves to be the only bottleneck, perhaps improved vibration motors can be included to mitigate the bottleneck in the next phone models.

The inventors, therefore, have harnessed the vibration motor hardware and its functionalities, from a communications perspective. The inventors have developed an orthogonal multi-carrier communication stack using vibration motor and accelerometer chips, and repeat the same for Samsung smart-phones. Design decisions for the latter are different due to software and application programming interface (API) limitations on smartphones, where vibration motors are mainly integrated for simple alerts and notifications. The inventors further have identified acoustic side channel attacks and, using signal cancellation and jamming, offer physical layer protection to eavesdropping.

Vibration Motor

A vibration motor (also called "vibra-motor") is an electro-mechanical device that moves a metallic mass around a neutral position to generate vibrations. The motion is typically periodic and causes the center of mass (CoM) of the system to shift rhythmically. There are mainly two types of vibra-motors depending on their working principle:

Eccentric Rotating Mass (ERM):

This type of vibration generators use a direct current (DC) motor to rotate an eccentric mass around an axis as depicted in FIG. 1A. As the mass is not symmetric with respect to its axis of rotation, the mass causes the device to vibrate during the motion. Both the amplitude and frequency of vibration depends on the rotational speed of the motor, which can in turn be controlled through an input DC voltage. With increasing input voltages, both amplitude and frequency increase almost linearly and can be measured by an accelerometer.

Linear Resonant Actuators (LRA):

This type of vibration motors generate vibration by linear movement of a magnetic mass, shown in FIG. 1B, as opposed to rotation in ERM. With LRA, the mass is attached to a permanent magnet which is suspended near a coil, called a "voice coil." Upon applying alternating current (AC) to the motor, the coil also behaves like a magnet due to the generated electromagnetic field and causes the mass to be attracted or repelled, depending on the direction of the current. This generates vibration at the same frequency as the input AC signal, while the amplitude of vibration is determined by the signal's peak-to-peak voltage. Accordingly, LRAs allow for regulating both the magnitude and frequency of vibration separately. Fortunately, most mobile phones today use LRA-based vibra-motors.

Regulating Vibration

Ideally, a controller should be able to regulate the vibra-motor at fine granularities using any analog waveform. Unfortunately, micro-controllers produce digital voltage values limited to a few discrete levels. A popular technique to approximate analog signals with binary voltage levels is called Pulse Width Modulation (PWM). This technique is useful to drive analog devices with digital data, without requiring a digital-to-analog converter (DAC).

PWM-Based Motor Control:

The core idea in PWM is to approximate any given voltage V by rapidly generating square pulses and configuring the pulse's duty cycle appropriately. For example, to create a 1V signal with binary voltage levels of 5V and 0V, the duty cycle needs to be 20%. Now, if the period of the square pulse is made very small (i.e., high frequency), the effective output voltage will appear as 1V. Towards this goal, the PWM frequency is typically set much higher than the response time of the target device so that the device experiences a continuous average voltage. Importantly, it is also possible to generate varying voltages with PWM, say a sine wave, by gradually changing the duty cycles in a sinusoidal fashion as shown in FIG. 2.

Vibration Sensors (e.g., Accelerometer) and Inertial Sensors (e.g., Gyroscope)

Different vibration sensors exist that can detect vibrations. One of the more popular vibration sensors found in many electronic devices is the accelerometer, although inertial sensors such as gyroscopes may also be used to pick up on vibrations. In various embodiments, a vibration sensor may be a gyroscope or may include both an accelerometer and a gyroscope to detect vibrations. The accelerometer is a micro electro-mechanical (MEMS) device that measures acceleration caused by motion. While the inner workings of accelerometers can vary, the core working principle pertains to a movable seismic mass that responds to the vibration of the object to which the accelerometer is attached. Capacitive accelerometers such as shown in FIG. 3 are perhaps most popular in smartphones today. When vibrated, the seismic mass moves between fixed electrodes, causing differences in the capacitance $c_1$ and $c_2$, ultimately producing a voltage proportional to the experienced vibration.

Sensing Acceleration

Modern accelerometers (and gyroscopes) sense the movement of the seismic mass along three orthogonal axes, and report them as a <X, Y, Z> tuple. The gravitational acceleration appears as a constant offset along the axis pointed towards the floor. The newest accelerometer chips support a wide range of adjustable sampling rates, typically from 100 mHz to 3.2 KHz. For this disclose, we choose the ADXL345 capacitive MEMS accelerometer, not only because it is used in most smartphones, but also because of programmability and frequency range.

Vibratory Transmission and Reception

The present inventors have designed a custom hardware prototype using the same chips that smartphones use, and characterize and evaluate the system. Remember that communication via vibrations may be by way of direct physical contact or through contact with a physical channel of communication, such as a physical object like a table, cantilever (FIG. 11) or other physical object.

Figure 4:
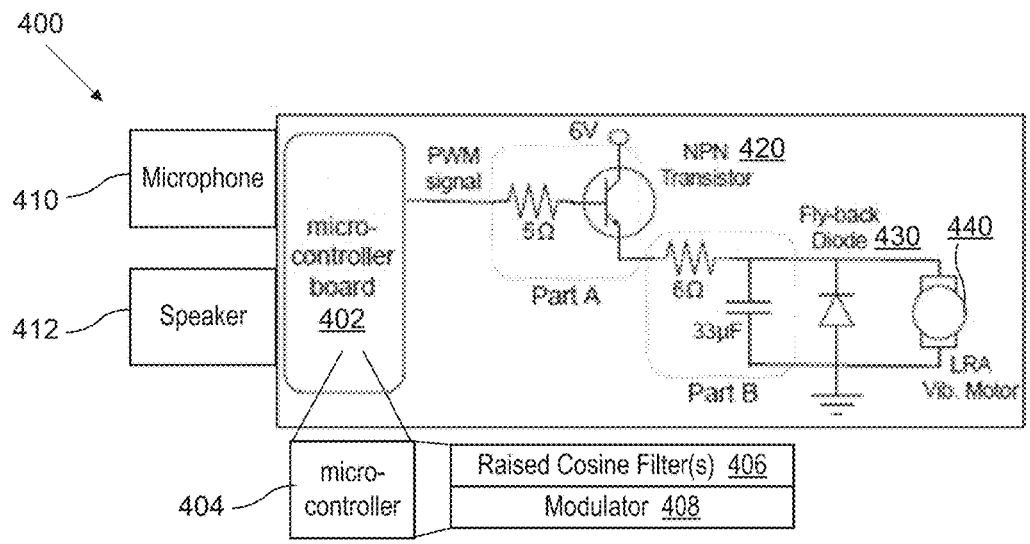
FIG. 4 is a diagram of an example data transmitter according to one embodiment of the present disclosure.

FIG. 4 is a diagram of an example data transmitter 400 according to one embodiment of the present disclosure. The data transmitter 400 may include a microcontroller board 402 having a microcontroller 404, a microphone 410, a speaker 412, a first resister and an NPN transistor 420 in Part A (a switch), a resister and a capacitor Part B (an RC circuit), a fly-back diode 430 and an LRA vibration (or vibra-) motor 440. The microcontroller 404 may include raised cosine filter(s) 406, a modulator 408 and other processing components. The data transmitter 400 may include more or fewer than these components. The microcontroller board 402 may be an Arduino® board, such as an open source hardware development platform equipped with a ATmega328 8-bit RISC microcontroller or other microcontroller 404.

The vibration frequency (and amplitude) may be finely controlled through a time-varying sequence of voltage levels fed to the vibra-motor 440. The microcontroller's output current fluctuates, leading to errors in the transmitted vibratory signals. Therefore, we power the vibra-motor 440 with a stand-alone 6V DC power supply and use the microcontroller signal to operate a switch that regulates the voltage to the motor 440. The NPN transistor 420 may be an NPN Darlington transistor (TIP122) that serves as a switch to control whether to drive the motor 440. The microcontroller signal from the microcontroller 404 may be connected to a base of the NPN transistor 420.

Assume regulation of the vibra-motor 440 in a sinusoidal fashion. Digital samples of the sine waveform may be pre-loaded into memory of the microcontroller 404, and PWM uses them to determine the width of the square waves. When the sine wave frequency is to be increased, the same digital samples are drawn at a faster rate and at precise timings. The switch (Part A) uses the PWM output to regulate the 6V DC signal, resulting in a signal similar to FIG. 2. We mitigate a number of engineering problems to run the set up correctly, including harmonic distortions due to the square pulses, spikes due to back EMF, and the like. The data transmitter 400 may move the PWM frequency to a high 32 KHz and use an RC filter (Part B) to remove the distortions. The data transmitter 400 may further use a fly-back diode 430 (such as a 1N4001 fly-back diode) to smooth out the spikes.

The data transmitter 400 may perform amplitude modulation on 10 different carrier signals uniformly spaced from 300 Hz to 800 Hz, where each carrier is modulated with a bandwidth of 40 Hz. Furthermore, the vibrations may also be parallelized on orthogonal motion dimensions (X and Z) with appropriate signal cancellation, as will be discussed in more detail.

Figure 5:
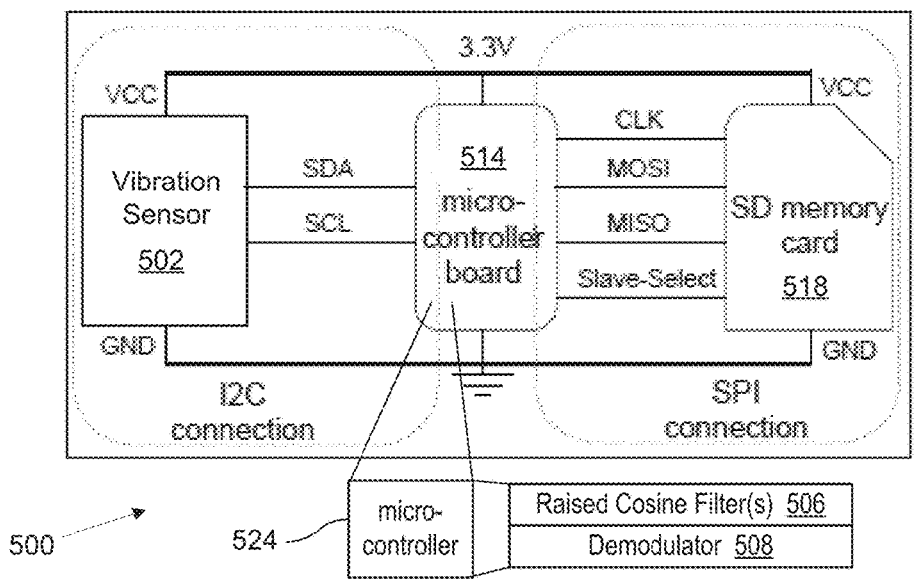
FIG. 5 is a diagram of an example data receiver according to one embodiment of the present disclosure.

FIG. 5 is a diagram of an example data receiver 500 according to one embodiment of the present disclosure. The data receiver 500 may include a vibration sensor 502 (such as an accelerometer or gyroscope), a microcontroller board 514 with a microcontroller 524 and a secure digital (SD) or other type of memory card 518. A common 3.3 volts may power the vibration sensor 502, the microcontroller board 514 and the SD memory card 518. The microcontroller 524 may include raised cosine filter(s) 506 and a demodulator 508 among other components.

The vibration sensor 502 may detect vibrations and send detected signals over a serial data (SDA) (or one bit) data bus, and a serial clock (SCL) to the microcontroller board 514 using a inter-integrated circuit (I2C) protocol or similar type of communication protocol. This data may then be stored in the SD memory card 518 by the microcontroller 524, using the displayed connections: clock (CLK); master out, slave in (MOSI); master in, slave out (MISO); and slave-select pin. The data may be stored to the SD memory card 518 using a serial peripheral interface (SPI) protocol connection or bus.

The data receiver 400 may be controlled through the microcontroller board 514 (which may, in one embodiment, be an Arduino® board) via the I2C protocol at 115200 baud rate, for example. In one embodiment, the accelerometer's sampling rate may be set to 1600 Hz and 10 bit output resolution. While higher sampling rates are possible, we refrain from doing so as the microcontroller 524 records the vibration data at a slower rate. In particular, the microcontroller 524 produces a sample each 0.625 ms, but the microcontroller 524 takes around 8 to 12 ms to periodically read and write to memory. This may be handled with a first-in-first-out (FIFO) mode of the vibration sensor 502, such that queued up data is read in as a burst. We also mount an on-board SD card to store data via the SPI protocol.

Figures 6A, 6B:
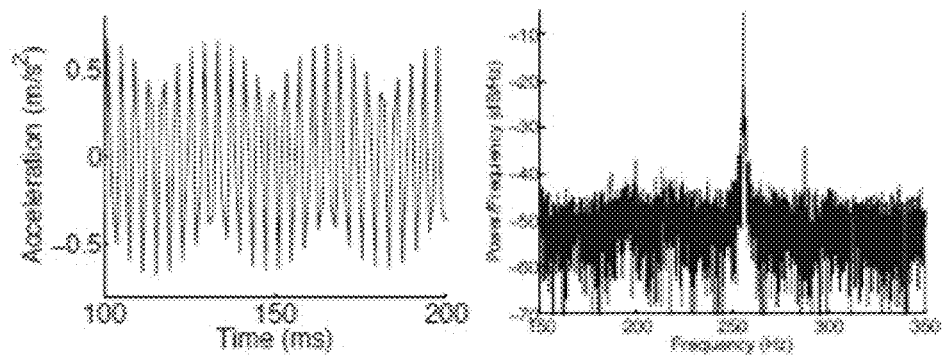
FIG. 6A is a graph of an example vibration sensor output of acceleration versus time.
FIG. 6B is a graph of an example vibration sensor output of frequency when a vibration motor is fed with a 250 Hz sine wave.

FIG. 6A is a graph of an example output of acceleration versus time for the vibration sensor 502. This graph shows the vibration sensor output when the vibra-motor 440 (of the data transmitter 400) is driven by the sinusoidal input and its output comes into contact the accelerometer. FIG. 6B is a graph of an example vibration sensor output of frequency when a vibration motor is fed with a 250 Hz sine wave.

Selecting the Carrier Signal

Figure 7:
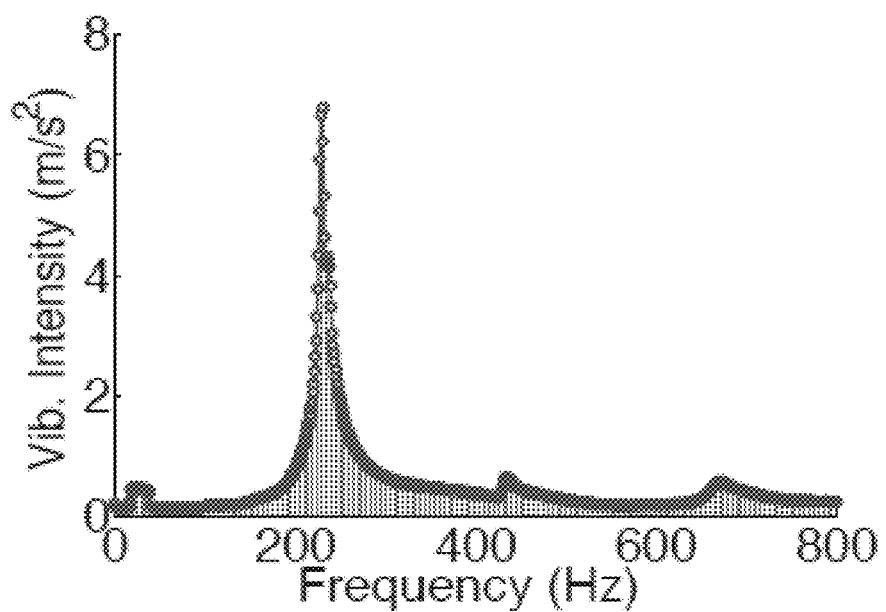
FIG. 7 is a graph of an example vibration motor's frequency response with a resonant frequency at around 231 Hz.

To reason about how data bits should be transmitted, we first carry out an analysis of the available spectrum. This available spectrum is actually bottlenecked by the maximum sampling rate of the vibration sensor of the data receiver 500 because this rate is 1600 Hz, the highest frequency the transmitter can use is naturally 800 Hz. Now, to test the system's frequency response in the [0,800] band, we perform a "sine sweep" test. The data transmitter 400, with the help of a waveform generator, may produce continuously increasing frequencies from 1 Hz to 800 Hz with constant amplitude (the frequency increments are at 1 Hz). FIG. 7 shows the corresponding vibration magnitudes recorded by the vibration sensor. The response appears weak up to 60 Hz (called the "inert band"), followed by improvements up until around 200 Hz, followed by a large spike at around 231 Hz. This spike is near the resonant frequency of the vibra-motor (confirmed in the data sheet).

Figure 8:
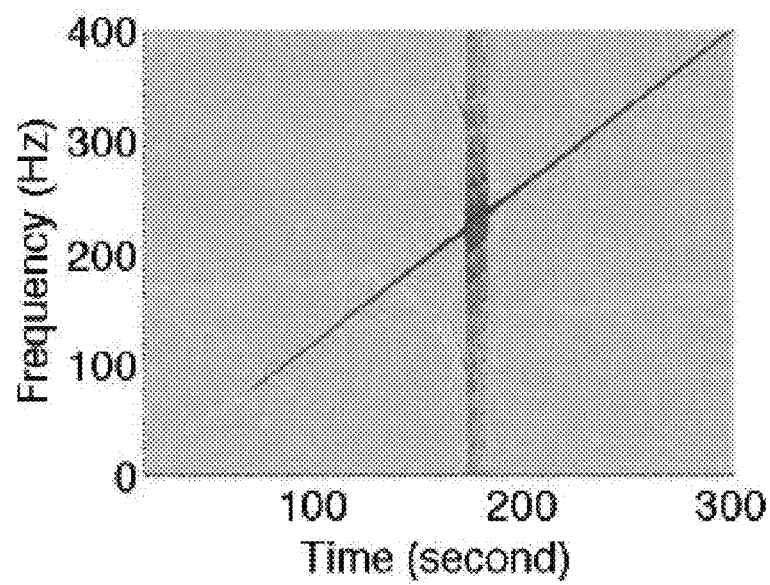
FIG. 8 is a graph of an example vibration motor's frequency response when driven at a resonance frequency.

Frequencies near the resonant band may serve as good carriers for amplitude-modulated data because of a larger vibration range. However, when we plot the frequency versus time spectrogram of the sine sweep test (FIG. 8), we find that the vigorous vibration around the resonant frequency spills energy in almost the entire spectrum. Therefore, transmitting on the resonant band can be effective for a single carrier system, but the interference ruins the opportunity to transmit data in parallel carriers. In light of this, we define a "resonant band" of 100 Hz around the peak, and move the carrier signals outside this band. We select 10 orthogonal carriers separated by 40 Hz from the non-resonant frequencies between 300 Hz and 800 Hz. The 40 Hz separation ensures the non-overlapping sidebands for the carriers, allowing reliable symbol recovery with software demodulation.

Synchronization

Microcontrollers (such as microcontroller 404 and microcontroller 524) may inject timing errors at various stages: variable delay in fetching digital samples from memory, during time-stamping the received samples, and due to oscillator/crystal frequency shifts with temperature. The timing errors manifest as fluctuations in vibration frequency, causing error in demodulation. To synchronize time between data transmission by the data transmitter 400 and data reception by the data receiver 500, the data transmitter 400 may generate a pilot vibration frequency at 70 Hz and transmit it in parallel to data bits. We choose 70 Hz to be above the inert band and lower than the resonant band. During reception, the microcontroller 524 detects the pilot frequency, measures the offset in sampling rate, and interpolates the received signal by adjusting for this offset. This operation may also correct all other frequencies in the spectrum needed for demodulation.

(De)Modulating the Carrier Signal

Figures 9A, 9B:
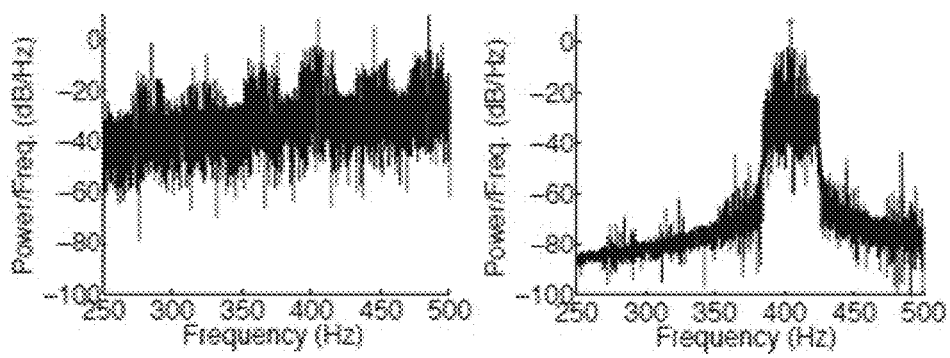
FIG. 9A is a graph of an example frequency spectrum of a signal received by a vibration sensor from a vibration motor.
FIG. 9B is a graph of an example frequency spectrum of the signal of FIG. 9A after filtering by a raised cosine filter.

The carrier frequencies are modulated with Amplitude Shift Keying (ASK) in light of bandwidth efficiency and simplicity in contrast to Frequency Shift Keying (FSK). The modulator 408 may modulate each of the 10 carriers with binary data at a symbol rate of 20 Hz. To prevent inter-carrier interference, the modulator 408 may shape the pulses with the raised cosine filter 406 for each carrier individually; the modulated carriers are then combined and fed to the vibration motor 440 to be transmitted. The data receiver 500 senses the energy in the pilot carrier, calibrates and synchronizes appropriately to identify the beginning of transmission. The microcontroller 524 again filters the received spectrum with a raised cosine filter 508 (which may be the same raised cosine filter 406 used by the microcontroller 404 during modulation) to isolate each carrier. The demodulator 508 may then proceed to demodulate individual carriers separately. FIGS. 9A and 9B show a part of the spectrum before and after filtering, for an example carrier frequency at 405 Hz. The demodulator 508 may perform the demodulation with envelop detection and precise sampling at bit intervals. We will evaluate this custom-designed system below and show ~200 bits/second data rates through vibration.

Orthogonal Vibration Dimensions

The above schemes, although adapted for vibra-motors, are grounded in the fundamentals of radio design. In an attempt to augment the bit rate, we observed that a unique property of accelerometers and gyroscopes is an ability to detect vibration on three orthogonal dimensions (X, Y, and Z). Although vibra-motors only produce signals on a single dimension, multiple vibra-motors may be used in parallel to produce vibrations along any or a combination of the X, Y and Z axes. As just one example, we have included an example in which the data transmitter includes two vibra-motors oriented in the Y and Z dimensions, respectively, and execute the exact multi-carrier amplitude modulated transmissions discussed above.

Figure 10:
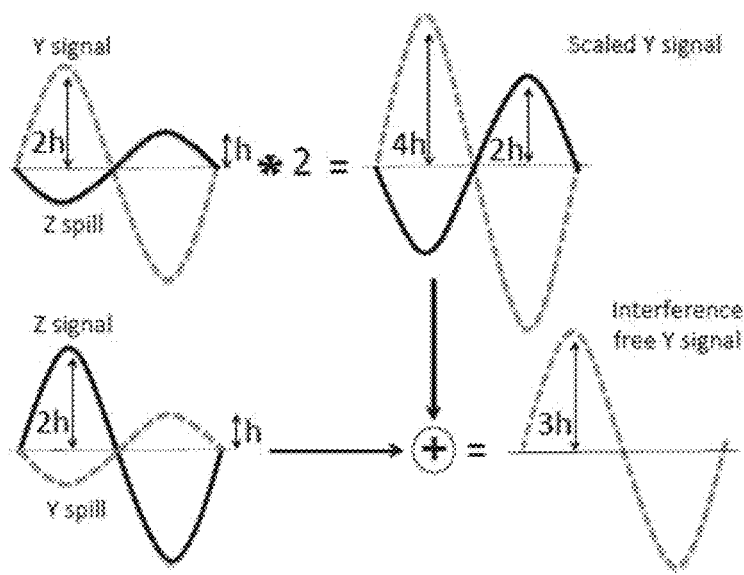
FIG. 10 is a set of graphs of an example series of orthogonal vibrations in Y and Z axes as received by a vibration sensor, and elimination of cross-axis interference.

Measurements show that vibration from one dimension spills into the other. However, this spilled interference exhibits a 180° phase lag with respect to the original signal, as well as an attenuation in the amplitude. FIG. 10 shows an example in which the Z-axis signal (solid black) has a spill on the Y-axis, with a reversed phase and halved amplitude. The vice versa also occurs. Now, to remove Z's spilled interference and decode the Y signal, we scale the Y signal so that the interference matches Z's actual amplitude, and then add it to the Z signal. The Z signal is removed quite precisely, leaving an amplified version of Y, which is then decoded through the envelope detector. The reverse is performed with Z's signal, resulting in a double improvement in data rate, evaluated later.

Smartphone Design

The above-explained custom design was extended to application on existing smartphones, such as, for example, Android™ smartphones. Android™ is of interest because Android™ offers APIs to a kernel level PWM driver for controlling the ON/OFF timings A user space module added to the Android™ may leverage third-party kernel space APIs to control the vibration amplitudes as well. However, this use space module still may not match the custom set-up explained previously. The PWM driver in Samsung® smartphones is set to operate on the resonant band of the LRA vibra-motor 440, and the vibration frequency may not be changed. This is understandable from the manufacturer's viewpoint, since vibra-motors are embedded to serve as a 1-bit alert to the user. However, for data communication, the non-linear response at the resonant frequencies presents challenges. Nonetheless, the present design may operate under these constraints, but may be limited to a single carrier frequency, modulated via amplitude modulation.

Smartphone Tx and Custom Rx

Figure 11:
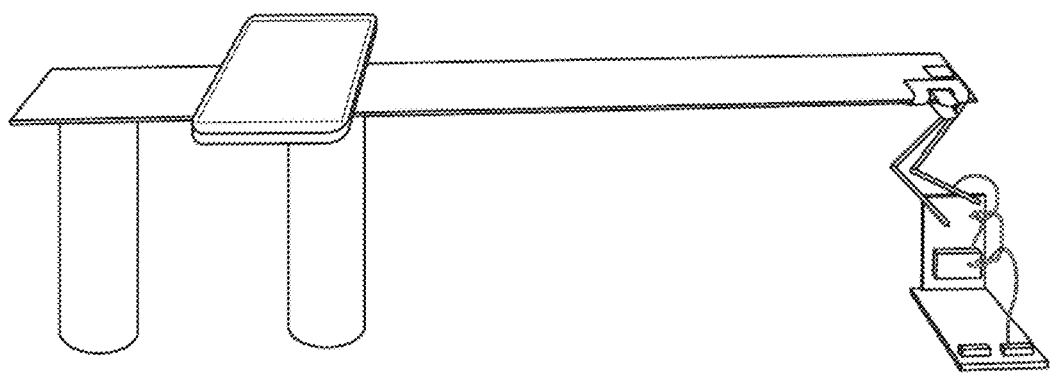
FIG. 11 is picture of an example cantilever-based receiver for vibration amplification according to one embodiment of the present disclosure.

One advantage of the resonant frequency is that it offers a larger amplitude range, permitting n-ary symbols as opposed to being binary (e.g., the amplitude range divided into n levels). To further amplify this range, we add a custom smartphone cradle: a cantilever-based wooden bridge-like framework that, in contact with the phone, amplifies specific vibration frequencies. While we will evaluate performance without this cradle, we researched whether auxiliary objects bring benefits to vibratory communication. FIG. 11 shows one such design, which includes a cantilever of a certain length supported at one end and connected to a vibration sensor on the other. When the transmitter phone is placed on a specific location on the bridge, and a vibration sensor connected to the other end, we indeed observe improved sign-to-noise ratio (SNR). By making the cantilever "channel" resonate along with the smartphone, we saw improved transmission capacity. We elaborate on the cantilever-based design next, followed by the communication techniques.

Cantilever Based Receiver Setup

Observe that every object has a natural frequency at which it vibrates. If an object is struck by a rod, say, the rod will vibrate at its natural frequency no matter how hard it is struck. The magnitude of the strike will increase the amplitude of vibration, but not its frequency. However, if a periodic force is applied at the same natural frequency of the object, the object exhibits amplified vibration: resonance. In our set-up, we use a one-foot-long wooden beam supported at one end, called a cantilever (FIG. 11). The smartphone transmitter placed near the supported end of the cantilever impinges a periodic force on the cantilever, calculated precisely based on the cantilever's resonant frequency (inversely proportional to the square root of its weight). We adjust the weight of the cantilever so that its natural frequency matches that of the phone's vibra-motor (which lies between 190 Hz to 250 Hz). This creates the desired resonance.

Figure 12:
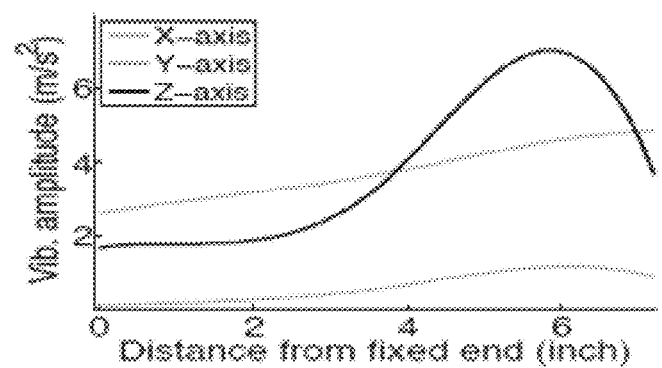
FIG. 12 is a graph of exemplary vibration as measured highest at a specific phone location on the cantilever beam shown in FIG. 11.

The vibration sensor is attached at the unsupported end of the cantilever (to the right of the cantilever in FIG. 11). FIG. 12 plots the measured amplitude variation (on three axes of the vibration sensor) as the smartphone is placed on different positions along the cantilever. We choose the position located six inches from the supported end, as it induces maximal amplification on all three axes of the vibration sensor.

Symbol Duration and the Ringing Effect

Figures 13A, 13B:
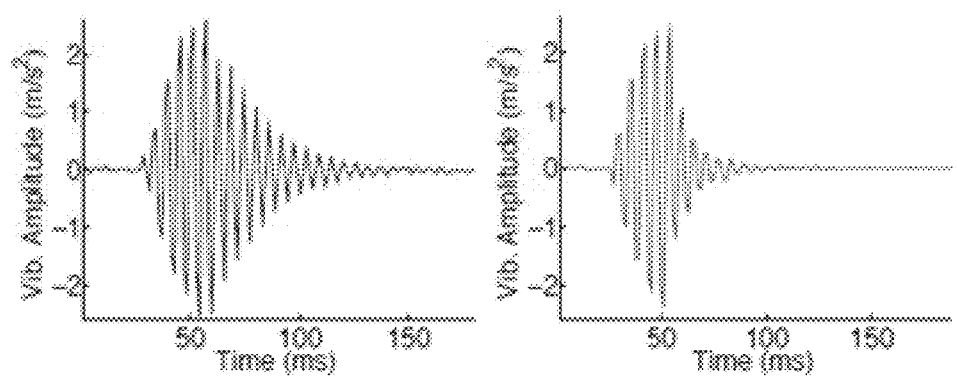
FIG. 13A is a graph of an example vibratory pulse of a smartphone, when a vibration motor is activated from 20 ms to 50 ms, showing a ringing effect.
FIG. 13B is a graph of the example vibratory pulse of FIG. 13A, showing reduced ringing from use of a braking voltage.

The microcontroller 404 communicates through amplitude modulation—pulses of n-ary amplitudes (or symbols) are modulated on the carrier frequency for a symbol duration. Preferably, the effect of a vibration should be completely limited within this symbol duration to avoid interference with the subsequent symbol (called inter-symbol interference). In practice, however, the vibration remains in the medium even after the driver stops the vibrator, known as the ringing effect. This is an outcome of inertia, where the vibra-motor mass continues oscillating or rotating for some period after the driving voltage is turned off. Until this extended vibration dampens down substantially, the next symbol may get incorrectly demodulated (due to this heightened noise floor). Moreover, the free oscillation of the medium also contributes to ringing. FIG. 13A shows a vibratory pulse of the smartphone, where the vibra-motor is activated from 20 to 50 ms. The vibration motor may consume 30 ms to overcome static inertia of the movable mass and reach its maximum vibration level. Once the voltage is turned off (at 50 ms) the vibration dampens slowly and consumes another 70 ms to become negligible. This dictates the symbol duration to be around 30+70=100 ms to avoid inter-symbol interference.

Vibration Dampening

To push for greater capacity, we reduce the symbol duration by dampening the ringing vibration. The ringing duration is a function of the amplitude of the signal—a higher amplitude signal rings for a longer duration. If, however, the amplitude can be deliberately curbed, ringing may still occur but will decay faster. Based on this observation, the microcontroller 404 applies a small braking voltage to the vibra-motor right after the signal has been sampled by the demodulator (30 ms). This voltage is deliberately small so that it does not manifest into large vibrations, and is applied for 10 ms. Once braking is turned off, the microcontroller 404 allows another 10 ms for the tail of the ringing to die down, and then transmit the next symbol, as shown in FIG. 13B. Thus, the symbol duration is 50 ms now (half of the original) and there is still some vibration when microcontroller 404 triggers the next symbol. While this adds slightly to the noise floor of the system, the benefits of a shorter symbol duration out-weighs the losses. Moreover, an advantage arises in energy consumption—triggering the vibra-motor from a cold start requires higher power. As we see later, activating it during the vibration tail saves energy.

(De)Modulation

Figure 14:
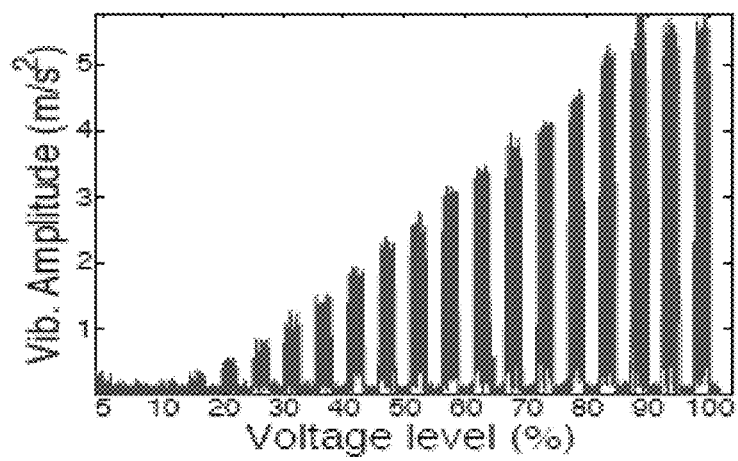
FIG. 14 is a graph of an example change of vibration amplitude as a percentage of maximum input voltage.

The (de)modulation technique is mostly similar to a single carrier of the custom hardware design. One difference is that the (de)modulation technique with a smartphone uses multiple levels of vibration amplitudes (up to 16), unlike the binary levels used in the custom design. FIG. 14 shows how microcontroller 404 can vary the voltage levels (as a percentage of maximum input voltage) to achieve different vibration amplitudes. If adequately stable, the amplitude at each voltage level can serve as separate symbols. Given the linear amplitude slope from voltage levels 15% to 90%, the microcontroller 404 may divide this range into n-ary equispaced amplitude levels, each corresponding to a symbol. However, due to various placements and/or orientations of the phone, this slope can vary to some degree. While this does not affect up to 8-ary communication, 16 symbols are susceptible to this because of inadequate gaps between adjacent amplitude levels. To cope, the microcontroller 404 may use a preamble of two symbols. At the beginning of each packet the data transmitter 400 may send two symbols with the highest and lowest amplitudes (15 and 90). The receiver computes the slope from these two symbols, and calibrates all the other intermediate amplitude levels from these slopes. The data receiver 500 may then decode the bits with a maximum likelihood based symbol detector.

Security

Vibrations from vibration motors produce sound and can leak information about the transmitted bits to an acoustic eavesdropper. This section is aimed at designing techniques that thwart such side channel attacks. We design this as a real-time operation on the smartphone

Acoustic Side Channel

The source of noise that actually leaks information is the rattling of the loosely-attached parts of the vibration motor 440, e.g., the unbalanced mass and metals supporting the vibration motor. Our experiments show that this sound of vibration (SoV) exhibits correlations of ~0.7 with the modulated frequency of the data transmission. Although SoV decays quickly with distance, microphone arrays and other techniques can be employed to still extract information. The disclosed system and methods work to prevent such attacks.

Canceling Sounds of Vibration (SoV)

One way to defend against eavesdropping is to jam the acoustic channel with a pseudorandom noise (PN) sequence, thus decreasing the SNR of the SoV. Since this jamming signal will not interfere with physical vibrations, it does not affect throughput. Upon implementation, we realized that the jamming signal was audible, and annoying to the ears. The more effective approach may be to cancel or suppress the SoV from the source, and then jam faintly, to camouflage the residue.

The microcontroller 404 may, though the vibration motor 440, produce an "anti-noise" signal that cancels out the SoV to ultimately create silence. The data transmitter 400 should generate this anti-noise as it knows the exact bit sequence that is the source of the SoV. The challenge is in detecting the ambient sound in real time and producing the precise negative (phase shifted) signals at all locations around the data transmitter 400.

The data transmitter 400 may know the precise bit sequence that is causing the SoV. This can help in modeling the sound waveform ahead in time, and be synchronized as close as possible to the SoV. The issue, however, is that the SoV varies based on the material medium on which the phone is placed; furthermore, the SoV needs to be cancelled at all locations in the surrounding area. Further, the phase of the SoV remains unpredictable as it depends on the starting position of the mass in the vibra-motor 440 and the delay to attain the full swing. Finally, Android™ offers little support for real-time audio processing, posing a challenge in developing SoV cancellation on off-the-shelf smartphones.

Ripple Cancel and Jam

The overall technique for cancellation and jamming is composed of three general sub-tasks: anti-noise modeling, phase alignment, and jamming.

Anti-Noise Modeling

The goal is to model the analog SoV waveform corresponding to the data bits that will be transmitted through vibration. Since the vibration amplitude and frequency of the vibration motor 440 are known (e.g., the carrier frequency), the first approximation of this model is relatively straight forward. However, as mentioned earlier, the difficulty arises in not knowing how the unknown material (on which the phone is placed) will impact the SoV. Apart from the fundamental vibration frequency, the precise SoV signal depends also on the strength and count of the overtones produced by the material. To estimate this, the data transmitter 400 first transmits a short preamble, listens to detect its Fast Fourier Transform (FFT) through the microphone 410, and picks the top-K strongest overtones. These overtones are combined in the revised signal model. Finally, the actual data bits are modeled in the time domain, reversed in sign, and added to create the final anti-noise signal. The anti-noise signal is ready to be played on the speaker 412, except that the phase of anti-noise needs to match the SoV.

Phase Alignment with Frequency Switch

Unfortunately, Android™ introduces a variable latency of up to 10 ms to dispatch the audio data to the hardware. This is excessive since a 2.5 ms lag can cause constructive interference between the anti-noise and the SoV. Fortunately, two observations help in this setting: (1) the audio continues playing at the specified sample rate without any significant fluctuation, and (2) the sample rate of the active audio stream can be changed in real-time. The data transmitter 400 can now control the frequency of the online audio by changing the playback sample rate.

We leverage this frequency control to make the microcontroller 404 match the phase of the anti-noise signal with the SoV. The microcontroller 404 may start the anti-noise signal as close as possible to the SoV, but increase the sampling frequency such that the fundamental frequency of the anti-noise signal increases by $\delta f$. When this anti-noise signal combines in the air with the SoV, the anti-noise signal causes the amplitude of the sound to vary because of the small difference in the fundamental frequencies. The maximum suppression of the SoV occurs when the amplitude of this combined signal is at its minimum. The phase difference between the SoV and the anti-noise signal is almost matched at this point, which we can refer to as phase lock time. At exactly this phase-lock time, microcontroller 404 may switch the fundamental frequency of the anti-noise signal to its original value (i.e., lower by $\delta f$). The microcontroller 404 recognizes this time instant by tracking the envelope of the combined signal and switching frequencies at the minimum point on the envelope.

Figure 15:
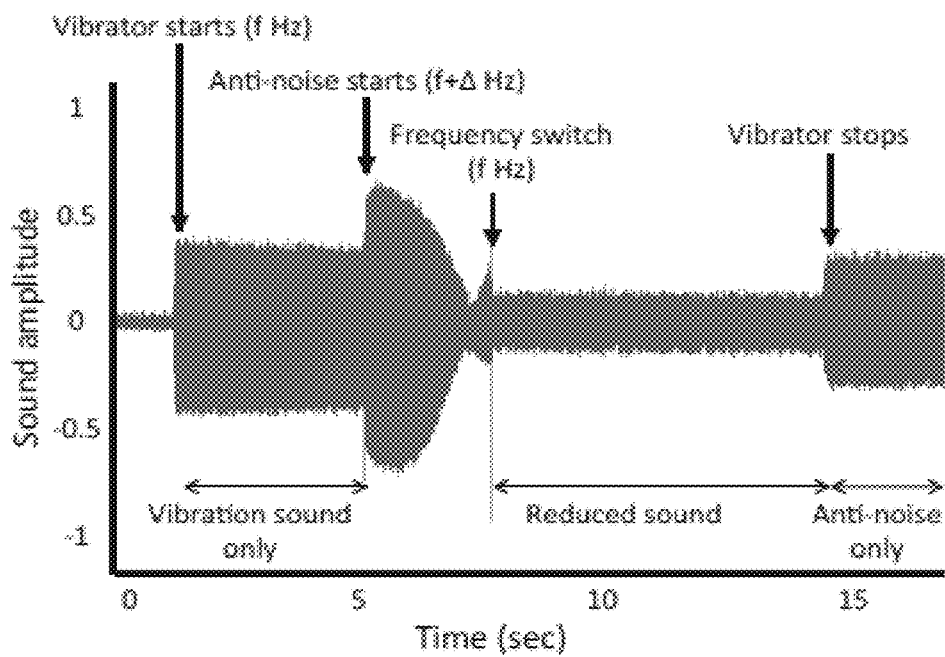
FIG. 15 is a graph of an example sound of vibration (SoV) wave and application of an anti-noise signal to at least partially cancel the SoV.

FIG. 15 illustrates the various steps leading up to the frequency switch, and the sharp drop in signal amplitude in response to the addition of the anti-noise signal. The suppressed signal remains at that level thereafter until the vibration motor 440 stops transmitting that particular symbol.

Jamming

The cancellation is not perfect because the timing of the operations are not instantaneous; microphone and speaker noise also pollute the anti-noise waveforms, leaving a small residue. To prevent attacks on this residue, the microcontroller 404 may superimpose a jamming signal with the goal of camouflaging the sound residue. A PN sequence may be added to the anti-noise waveform once it has phase-locked with the vibration sound. Unfortunately, Android™ does not allow loading a second signal on top of a signal that is already playing. Note that if we load the jamming signal upfront (along with the modeled anti-noise signal), the precise phase estimation fails. We develop an engineering work-around. When modeling the anti-noise waveform, the microcontroller 404 may also add the jamming noise sequence, but pre-pad the latter with a few zeros. Thus, when the SoV and anti-noise signal combine, the zeros still offer opportunities for detecting the time when the signals precisely cancel. The microcontroller 404 may phase-lock at these times and the outcome is the residual signal from imperfect cancellation, plus the jamming sequence. We will show in the evaluation how the SoV's SNR degrades due to such cancellation and jamming, offering good protection to eavesdropping. The tradeoff is that we need a longer preamble now for this phase alignment process. However, this is only an issue arising from current Android™ APIs.

System Evaluation

We evaluate the proposed data transmitter 400 and data receiver 500 designs in three phases: the custom hard-ware, the smartphone prototype, and security.

Custom Hardware

Figure 16A:
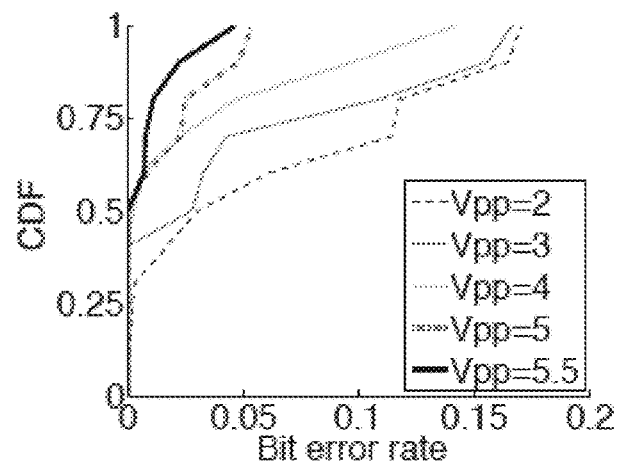
FIG. 16A is a graph of an example bit error rate (BER) as a function of an input signal peak-to-peal voltage to a vibration motor.

Recall that the custom hardware is composed of the vibra-motor 440 and a vibration sensor 502 such as an accelerometer (or gyroscope) chip controlled by the microcontroller 404 (which is located on, for example, an Arduino® board). We bring the data transmitter 400 and the data receiver 500 into physical contact (which may include some medium on which they are placed) and initiate packet transmission of various lengths (consuming between 1 second to 10 seconds). Each packet contains pseudo-random binary bits at 20 Hz symbol rate on 10 parallel carriers. The bits are demodulated at the data receiver 500 and compared against the ground truth. We repeat the experiment for increasing signal energy (e.g., by varying the peak-to-peak signal voltage, $V_{pp}$, from 1V to 5V). FIG. 16A plots the bit error rate (BER) as a function of peak-to-peak input voltage ($V_{pp}$) to the vibra-motor 440 and demonstrates how it diminishes with higher SNR. At the highest SNR, and aggregated over all carrier frequencies, the present design achieves the 80th percentile BER of 0.017 translating to an average bit rate of 196.6 bits/s.

Behavior of Carriers

Figure 16B:
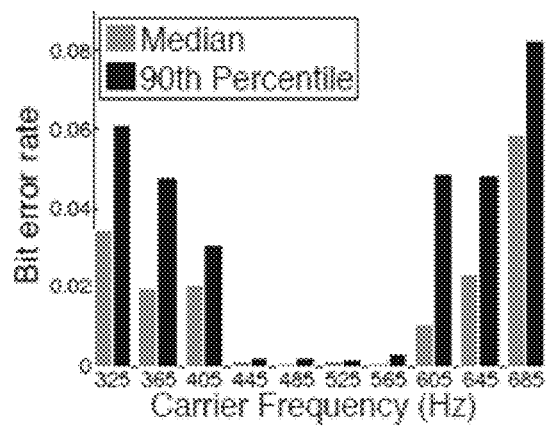
FIG. 16B is a graph of an example per-carrier BER across 10 carrier frequencies.

In evaluating BERs across different carrier frequencies, we observe that not all carriers behave similarly. FIG. 16B illustrates that carrier frequencies near the center of the spectrum perform consistently better than those near the edges. One of the reasons is aliasing noise. Ideally, the vibration sensor should low-pass-filter the signal before sampling, to remove signal components higher than the Nyquist frequency. However, inexpensive vibration sensors do not employ anti-aliasing filters, causing such undesirable effects. Carriers near the resonant band also experience higher noise due to the spilled-over energy.

Figure 16C:
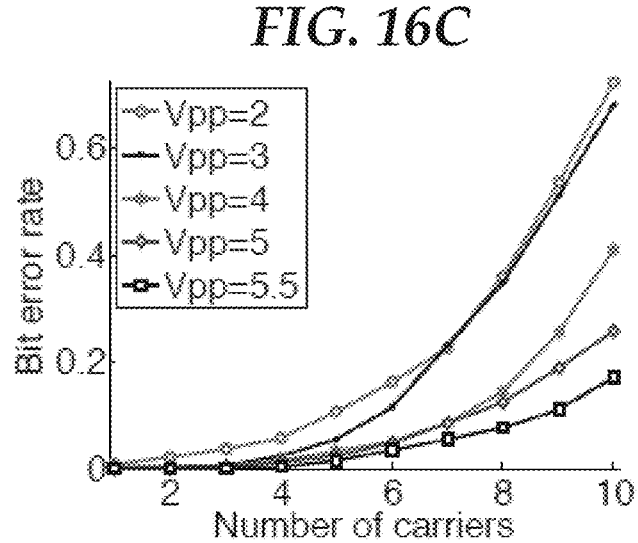
FIG. 16C is a graph of an example BER as a function of a number of carriers used where a bit rate in each barrier is 20 bits/second.

Increasing the number of carriers enables greater parallelism (bit rate), at the expense of higher BER per carrier. To characterize this tradeoff, we transmit data on an increasing number of carriers, starting from the middle of our spectrum and activating carriers on both sides, one at a time. FIG. 16C illustrates BER variations with increasing number of carriers, for varying signal energy (peak-to-peak voltage, $V_{pp}$).

Figure 17:
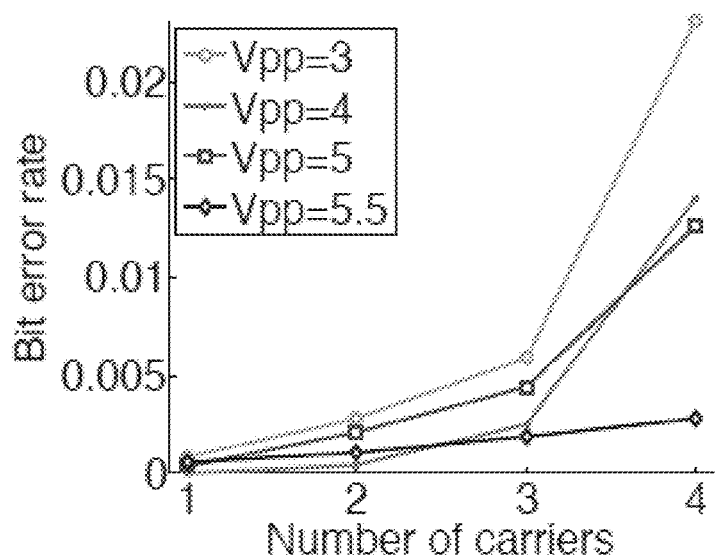
FIG. 17 is a graph of an example BER versus number of carriers, zoomed in up to four carriers.

As each carrier operates at fixed 20 Hz symbol rate, this also shows the bit rate versus BER characteristics of our system. FIG. 17 zooms in on the BERs of the best four carriers.

Temporal Stability

Figure 18:
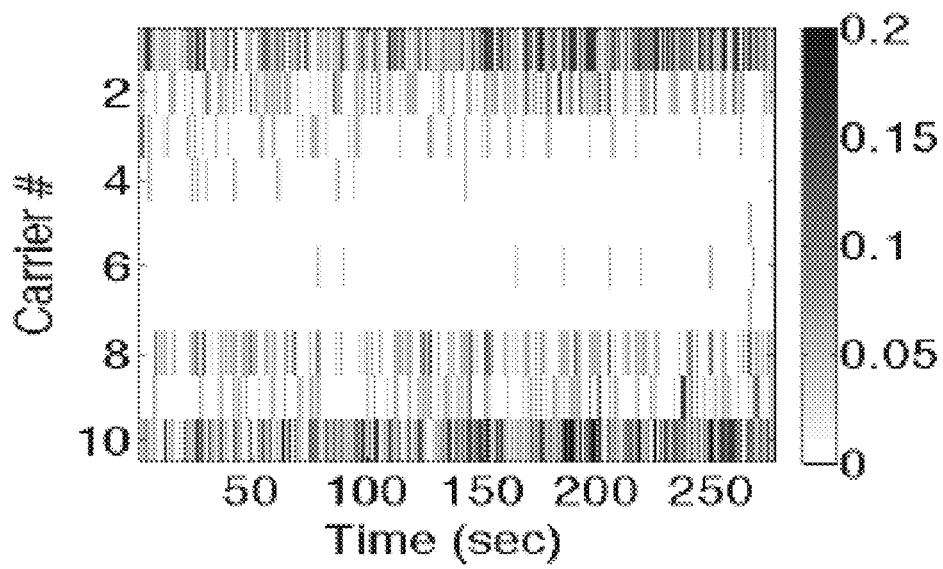
FIG. 18 is a graph showing that the BER per-carrier does not degrade after a vibration motor is run for long durations.

Given that vibra-motors and vibration sensors are essentially mechanical systems, we intend to evaluate their properties when they are made to operate continuously for long durations. Given the low bit rates, this might be the case when relatively longer packets need to be transmitted. Towards this end, we continuously transmit data for 50 sessions of 300 seconds each. FIG. 18 plots the per-carrier BER (computed in the granularity of 10 second periods) of a randomly selected session. The Y-axis shows each of the carriers and the X-axis is time. The BERs vary between 0.02 near the center to 0.2 near the edge. Overall results show no visible degradation in BER even after running for 300 seconds.

Exploiting Vibration Dimensions

Figure 19A:
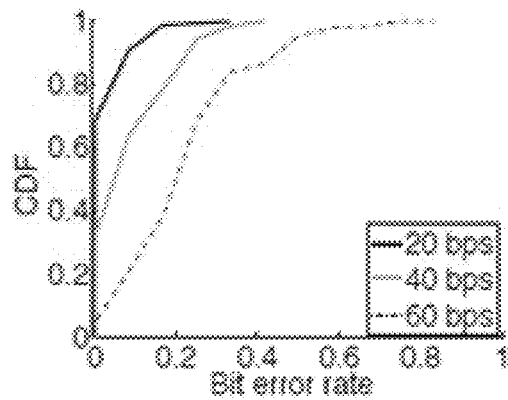
FIG. 19A is a graph of an example BER per carrier for parallel transmissions on orthogonal dimension of the Y-axis.
Figure 19B:
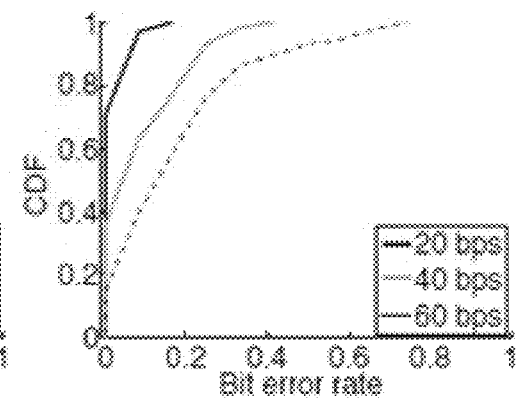
FIG. 19B is a graph of an example BER per carrier for parallel transmissions on orthogonal dimension of the Z-axis.

Recall that the data transmitter 400 may use two vibra-motors in parallel to exploit the orthogonality of vibrations along the Y-axis and the Z-axis of the vibration sensor, and theoretically could use three vibra-motors for all three axes. FIGS. 19A and 19B illustrate the distribution of BER achieved across carrier frequencies on the Y-axis and the Z-axis, respectively. We also attempt to push the limits by modulating greater than 20 bits/s; however, the BER begins to degrade. In light of this, the disclosed design achieves median capacity of around 400 bits/s (e.g., 20 bits/s per carrier×10 carriers×2 dimensions). While the tail of the BER distribution still needs improvement, we believe coding can be employed to mitigate some of it.

Smartphone Prototype

Calibration

Figure 20:
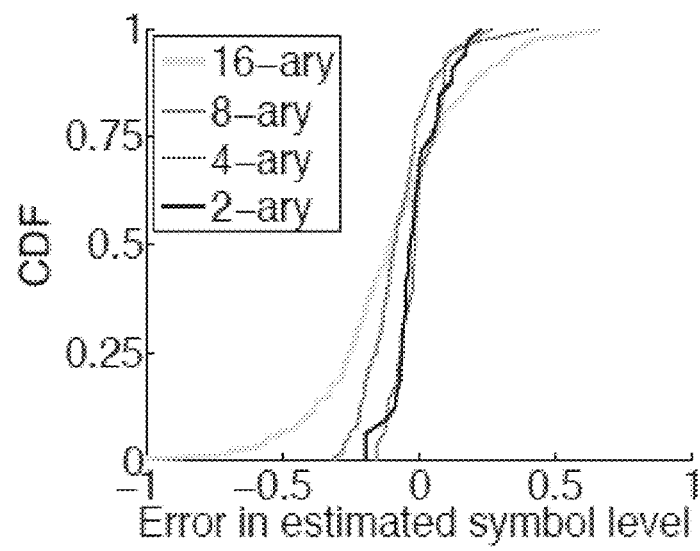
FIG. 20 is a graph of an example cumulative distribution function (CDF) of estimated symbol level error as a fraction of a mean inter-symbol difference.

Vibrations will vary across transactions due to phone orientation, humans holding it, different vibration medium, and other factors. As discussed earlier, a demodulator may calibrate for these factors, but may pay a penalty whenever the calibration is imperfect. We evaluate accuracy of calibration using the error between the estimated amplitude for a symbol, and the mean amplitude computed across all received symbols. FIG. 20 plots the normalized error for various n-ary modulations—the normalization denominator is used as the difference between adjacent amplitudes.

BER with Smartphones

FIG. 21A plots the confusion matrix of transmitted and received (or demodulated) symbols, for 16-ary modulation. While some errors occur, we observe that they are often the symbol adjacent to the one transmitted. In light of this, the present system (referred to as Ripple) uses Gray codes to minimize such well-behaved errors. With these codes and calibration, FIG. 21B illustrates the estimated BER for different bit rates, for each of the four modulation schemes. As comparison points, the "Basic" symbol detector uses predefined thresholds for each symbol and maps the received sample to the nearest amplitude. The "Ideal" scheme identifies the bits using the knowledge of all received symbols. Ripple performs well even at higher bit rates, which is not the case with Basic.

FIG. 21C illustrates the BER per symbol for 16-ary modulation, showing that symbols corresponding to the high vibration amplitudes experience higher errors. The reason is that the consistency of the vibration motor degrades at high amplitudes. We have verified this carefully by observing the distribution of received vibration amplitudes for large data traces.

Impact of Phone Orientation

The LRA vibra-motor inside the Galaxy S4 generates linear vibration along one dimension; the teardown of the phone shows the vibra-motor's axis aligned with the Z-axis of the phone. Thus, an accelerometer should mostly witness vibration along the Z-axis. The other two axes do not exhibit sufficient vibration at higher bit rates. This is verified in Table 1 where the first four data points are from when the phone is laid flat on top of the cantilever. However, once the phones are made to stand vertically or on the sides, the X-axis and Y-axis align with the accelerometer's Z-axis, causing an increase in errors. This suggests that the best contact points for the phones are their XY planes, mainly due to the orientation the vibration motor.

TABLE 1

BER with 16-ary for various orientations.

| Orientation | Hor. A | Hor. B | Hor. C | Hor. D | Ver. A | Ver. B |
|---|---|---|---|---|---|---|
| Mean BER | 0.025 | 0.029 | 0.002 | 0.029 | 0.197 | 0.178 |

Phone Held in Hand (No Cantilever)

Figure 22:
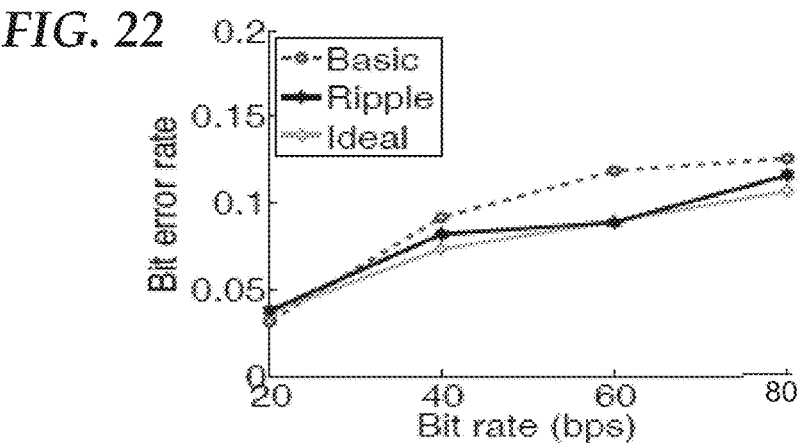
FIG. 22 is a graph of an example BER with a hand-held phone.
Figure 23A:
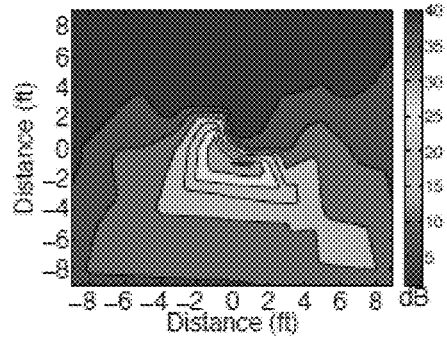
FIG. 23A is a graph of an example sound profile for an acoustic side channel leakage on glass.
Figure 23B:
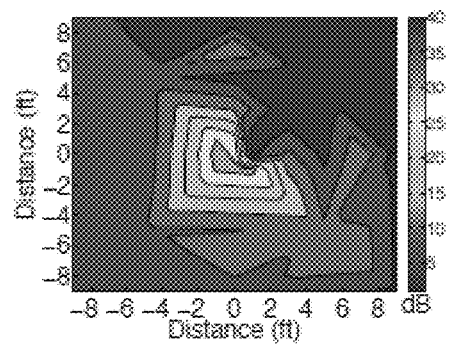
FIG. 23B is a graph of an example sound profile for an acoustic side channel leakage on metal.
Figure 23C:
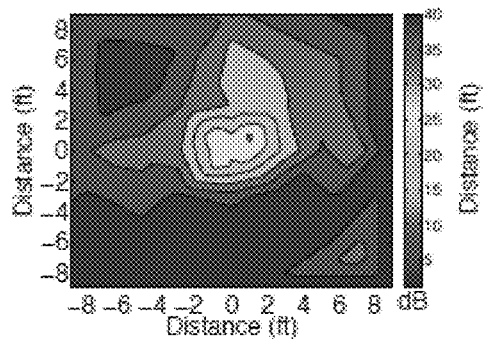
FIG. 23C is a graph of an example sound profile for an acoustic side channel leakage on another phone.
Figure 23D:
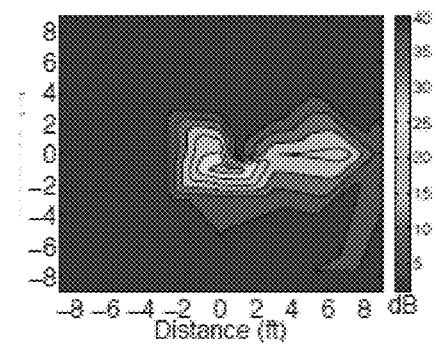
FIG. 23D is a graph of an example sound profile for an acoustic side channel leakage on wood.

We experiment with a scenario in which the accelerometer-based receiver is on the table, and the hand-held phone is made to touch the top of the receiver. The alignment is crudely along the Z axis. This setup adversely affects the system by (1) eliminating the amplitude gain due to the cantilever, and (2) dampens vibration due to the hand's absorption. FIG. 22 illustrates the results where the total vibration range is now smaller, pushing adjacent symbol levels to be closer to each other, resulting in higher BER.

Security

Acoustic Signal Leakage

To characterize the maximum acoustic leakage from vibrations, we run the vibra-motor 440 at its highest intensity and record the SoV at various distances, using smartphone microphones sampled at 16 KHz. This leakage is naturally far higher than a typical vibratory transmission (composed of various intensity levels), so mitigating the most severe leakage is stronger security. We also realize that the material on which the smartphone is placed matters. We therefore repeated the same experiment by placing the phone on (a) glass plate, (b) metal plate (aluminum), (c) on the top of another smartphone, and (d) our custom wooden cantilever setup. FIGS. 23A, 23B, 23C and 23D illustrates the contour plots for each scenario, respectively. It appears that glass causes the strongest side channel leak, and wood exhibits the least minimum of the tested materials. The following experiments were, therefore, performed on glass.

Acoustic Leakage Cancellation

Figure 24:
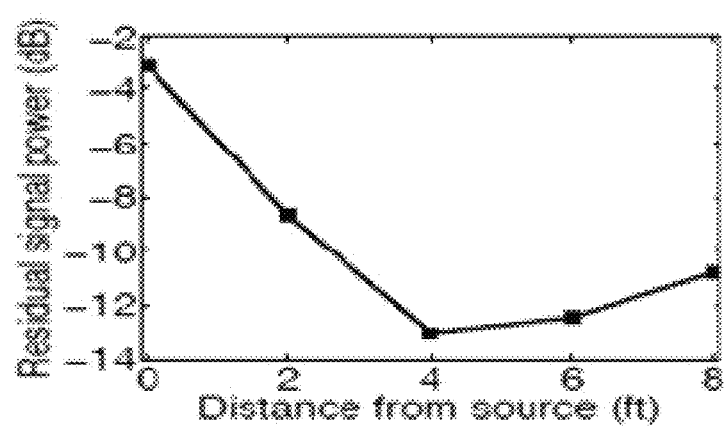
FIG. 24 is a graph of an example ratio of residual to original signal power (in dB) at increasing distances from a source.

Recall that the data receiver 500 records the SoV, produces a synchronized phase-shifted signal to cancel the SoV, and superimposes a jamming sequence to further camouflage the leakage. FIG. 24 shows the impact of cancellation using a ratio of the power of the residual signal to the original signal, measured at different distances. As shown, the cancellation is better with increasing distance. This is because the generated anti-noise signal approximates the first few strong harmonics of the sound. However, the SoV also contains some other low-energy components that fade with distance making the anti-noise signal more similar to the vibration's sounds. Hence, the cancellation is better at a distance, until around four feet, after which the residual signal drops below the noise floor and our calculated power becomes constant. The original signal also decreases but is still above the noise floor past 4 feet, and therefore, the ratio increases.

Acoustic Jamming

The data transmitter 500 may apply jamming to further camouflage any acoustic residue after cancellation. To evaluate the lower bound of jamming efficiency, we make the experiment more favorable to the attacker. We transmit only two amplitude levels (binary data bits) at 10 bits per second.

We place the phone on glass, the scenario that creates loudest sound. The eavesdropper microphone is placed as close as possible to the transmitter, without touching it. To quantify the efficacy of the jamming, we correlate the actual transmitted signal with the received jammed signal and plot the correlation coefficient in the Table 2, which includes the mean and standard deviation of the correlation coefficient for increasing jamming to signal power ratio. A high correlation coefficient indicates high probability of correctly decoding the message by the adversary and the vice versa. The table shows the correlation values for various ratios of the jamming to signal power. Evident from the table, the correlation coefficient sharply decreases when Ripple increases the jamming power.

TABLE 2

| Power Ratio | 0 | 0.4 | 0.8 | 1.2 | 1.6 | 2 |
|---|---|---|---|---|---|---|
| Corr. Mean | 0.68 | 0.55 | 0.35 | 0.19 | 0.18 | 0.09 |
| Corr. Std. Dev. | 0.027 | 0.015 | 0.017 | 0.008 | 0.003 | 0.003 |

Figure 25:
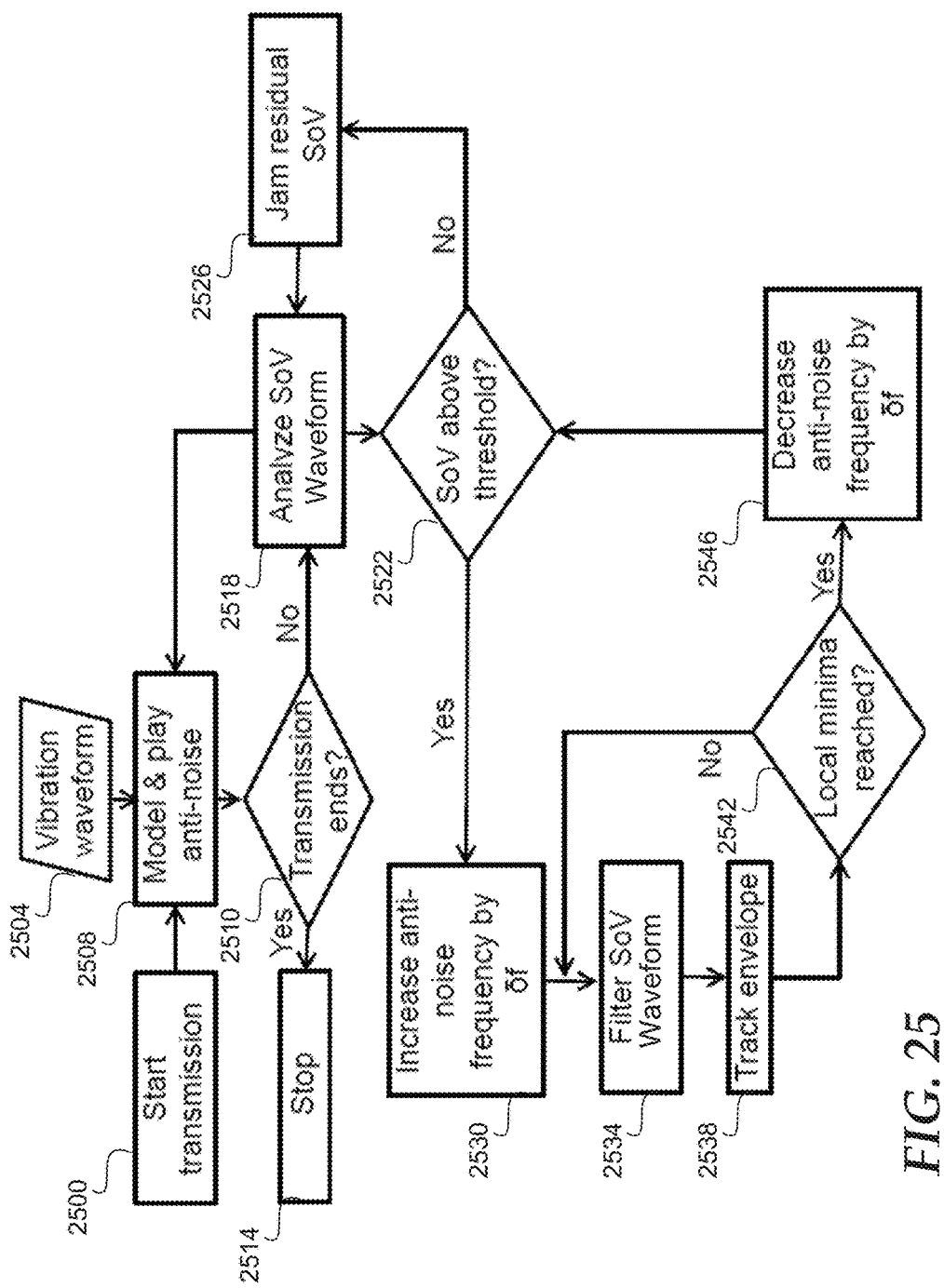
FIG. 25 is a flow chart of an exemplary method for modeling and using anti-noise to cancel out sound of vibration according to an embodiment of the present disclosure.

FIG. 25 is a flow chart of an exemplary method for modeling and using anti-noise to cancel out sound of vibration. The data transmitter 400 may execute the method, beginning with a start to transmission, e.g., a brief symbol or other signal for creating the sound of vibration (SoV) (2500). The SoV waveform may bounce back and be detected with a microphone of the data transmitter (2504). The method may continue by modeling and playing an anti-noise signal through a speaker of the data transmitter, where the SoV is designed to cancel the SoV (2508). The method may continue to determine whether the transmission ends (2510). If yes, the method ends until the start of another transmission (2514).

If the transmission has not ended, the method may analyze the SoV waveform (2518) and determine whether the SoV is above a threshold level of noise (2522). If the SoV is below the threshold, the method may then jam any residual SoV based on the analysis (2526) and continue to analyze the SoV waveform (2518). If the SoV is above the threshold level of noise, then the method may increase the frequency of the anti-noise signal by δf (2530). The method may continue with filtering the SoV waveform as discussed previously (2534), and tracking (or detecting) an envelope of the SoV waveform (2538). The method may continue to determine whether the SoV waveform has reached a local minima (2542). If it has not, then the method may continue to filter the SoV waveform (2534) and track the envelope of the SoV waveform (2538). When the local minima is reached, the method may continue to decrease the anti-noise signal frequency by δf (2546). The method may then continue to determine whether the SoV is above the threshold level of noise as before (2522).

Figure 26:
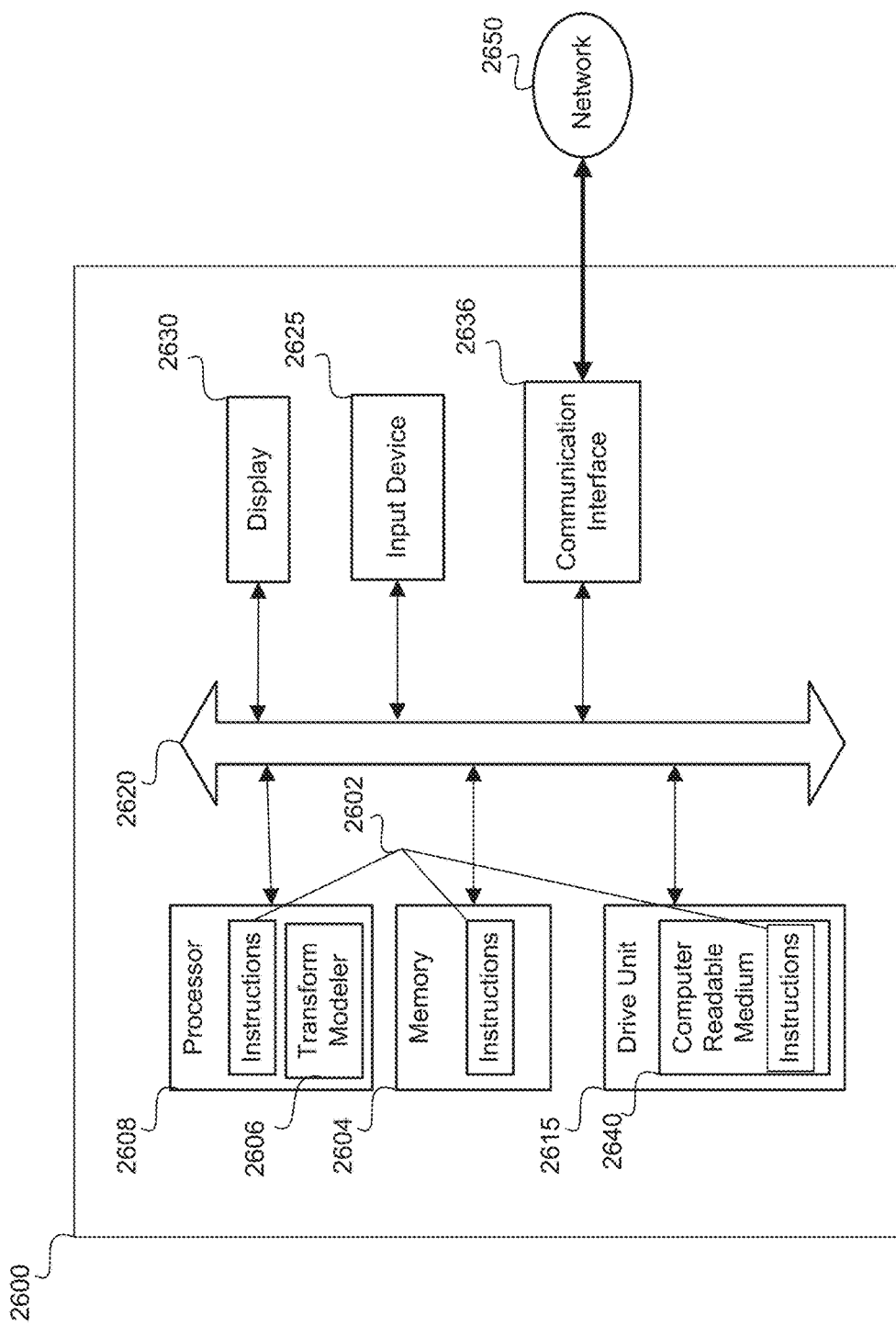
FIG. 26 is a computing system that may be used for executing ripple cancellation and jamming according the embodiments disclosed herein.

FIG. 26 illustrates a computer system 2600, which may represent aspects of the data transmitter 400, the data receiver 500 or any other device or system to which is referred or which is capable of executing the embodiment as disclosed herein. The computer system 2600 may include an ordered listing of a set of instructions 2602 that may be executed to cause the computer system 2600 to perform any one or more of the methods or computer-based functions disclosed herein. The computer system 2600 may operate as a stand-alone device or may be connected to other computer systems or peripheral devices, e.g., by using a network 2610.

In a networked deployment, the computer system 2600 may operate in the capacity of a server or as a client-user computer in a server-client user network environment, or as a peer computer system in a peer-to-peer (or distributed) network environment. The computer system 2600 may also be implemented as or incorporated into various devices, such as a personal computer or a mobile computing device capable of executing a set of instructions 2602 that specify actions to be taken by that machine, including and not limited to, accessing the internet or web through any form of browser. Further, each of the systems described may include any collection of sub-systems that individually or jointly execute a set, or multiple sets, of instructions to perform one or more computer functions.

The computer system 2600 may include a memory 2604 on a bus 2620 for communicating information. Code operable to cause the computer system to perform any of the acts or operations described herein may be stored in the memory 2604. The memory 2604 may be a random-access memory, read-only memory, programmable memory, hard disk drive or any other type of volatile or non-volatile memory or storage device.

The computer system 2600 may include a processor 2608, such as a central processing unit (CPU) and/or a graphics processing unit (GPU). The processor 2608 may include one or more general processors, digital signal processors, application specific integrated circuits, field programmable gate arrays, digital circuits, optical circuits, analog circuits, combinations thereof, or other now known or later-developed devices for analyzing and processing data. The processor 2608 may implement the set of instructions 2602 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The processor 2608 may include a transform modeler 2606 or contain instructions for execution by a transform modeler 2606 provided a part from the processor 2608. The transform modeler 2606 may include logic for executing the instructions to perform the transform modeling and image reconstruction as discussed in the present disclosure.

The computer system 2600 may also include a disk (or optical) drive unit 2615. The disk drive unit 2615 may include a non-transitory computer-readable medium 2640 in which one or more sets of instructions 2602, e.g., software, can be embedded. Further, the instructions 2602 may perform one or more of the operations as described herein. The instructions 2602 may reside completely, or at least partially, within the memory 2604 and/or within the processor 2608 during execution by the computer system 2600.

The memory 2604 and the processor 2608 also may include non-transitory computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 2600 may include an input device 2625, such as a keyboard or mouse, configured for a user to interact with any of the components of the computer system 2600. It may further include a display 2630, such as a liquid crystal display (LCD), a cathode ray tube (CRT), or any other display suitable for conveying information. The display 2630 may act as an interface for the user to see the functioning of the processor 2608, or specifically as an interface with the software stored in the memory 2604 or the drive unit 2615.

The computer system 2600 may include a communication interface 2636 that enables communications via the communications network 2610. The network 2610 may include wired networks, wireless networks, or combinations thereof. The communication interface 2636 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents, now presented or presented in a subsequent application claiming priority to this application.

What is claimed is:

1. A data transmitter comprising:
a set of vibration motors comprising a first vibration motor to generate first symbols along a first axis at a first frequency and a second vibration motor to generate second symbols along a second axis at a second frequency, the first axis being substantially orthogonal to the second axis;
a switch coupled to the set of vibration motors, the switch to regulate voltage from a direct-current (DC) power supply to the set of vibration motors; and
a microcontroller coupled to the switch, the microcontroller to generate a pulse width modulation (PWM) signal with which to drive the switch and regulate the voltage to the set of vibration motors in a sinusoidal manner, to generate data as the first symbols and the second symbols from vibrations that form a series of bits from the set of vibration motors.

2. The data transmitter of claim 1, wherein the switch is a NPN Darlington transistor, the data transmitter further comprising:
a resistor-capacitor (RC) filter to remove distortions from the first symbols and the second symbols; and
a fly-back diode to smooth out spikes in the first symbols and the second symbols, wherein the RC filter and the fly-back diode are coupled between the switch and the set of vibration motors.

3. The data transmitter of claim 1, wherein the set of vibration motors causes associated ringing vibrations when driven, and wherein the microcontroller is further to control the vibration motor to apply a small braking voltage a predetermined period of time after being driven to generate a symbol, wherein the predetermined period of time is sufficient for a demodulator of a data receiver to sample the symbol.

4. The data transmitter of claim 1, wherein the first frequency and the second frequency are non-resonant frequencies between 300 Hz and 800 Hz and are separated by at least 40 Hz to ensure non-overlapping sidebands.

5. The data transmitter of claim 1, wherein the microcontroller further comprises:
a first raised cosine filter to filter a first carrier signal;
a second raised cosine filter to filter a second carrier signal;
an amplitude shift keying (ASK) modulator to modulate the first carrier signal separately from the second carrier signal, to generate a modulated first carrier signal and a modulated second carrier signal; and
wherein the microcontroller generates the PWM signal for the modulated first carrier signal and the modulated second carrier to generate the first symbols and the second symbols, respectively.

6. The data transmitter of claim 1, wherein the microcontroller is further to transmit a pilot frequency in a pilot carrier signal from at least one of the first vibrator motor or the second vibrator motor, the pilot carrier signal being transmitted in parallel to the series of bits and to synchronize transmission and reception of the series of bits.

7. The data transmitter of claim 1, wherein the first symbols and the second symbols cause the set of vibration motors to emanate a sound of vibration (SoV) that includes data leakage, and wherein the microcontroller is further to generate an anti-noise signal to at least partially cancel the SoV responsive to emanation of the SoV, the data transmitter further comprising:
a microphone coupled to the microcontroller, the microphone to detect the SoV; and
a speaker coupled to the microcontroller, the speaker to output the anti-noise signal.

8. The data transmitter of claim 7, wherein the microcontroller is further to model the anti-noise signal by:
before generating the PWM signal, transmitting a brief symbol;
detecting a fast Fourier transform (FFT) of an SoV of the brief symbol;
selecting a top predetermined number of strongest overtones within the FFT;
combining the top predetermined number of strongest overtones into a revised signal model in a frequency domain;
converting the revised signal model to a time domain to generate a converted signal model; and
generating an inverse of the converted signal model.

9. The data transmitter of claim 7, further comprising a receiver coupled to the microphone to sample the SoV at a determined frequency, wherein the microcontroller is further to:
output, through the speaker, the anti-noise signal close to timing of the SoV;
increase a sampling frequency such as to increase a fundamental frequency of the anti-noise signal by δf;
detect a phase-lock between the anti-noise signal and the SoV; and
reduce the sampling frequency by δf, back to an original sampling frequency, but matching phase with the SoV.

10. The data transmitter of claim 7, wherein a residue of the SoV remains after the speaker outputs the anti-noise signal, wherein the microcontroller further to:
model the anti-noise signal before output by the speaker; and
add a jamming signal to the anti-noise signal, as modeled, the jamming signal being pre-padded with zeros to delay release of the jamming signal.

11. The data transmitter of claim 10, wherein the microcontroller is further to:
during the delay of release of the jamming signal, phase lock the anti-noise signal with the SoV; and
release the jamming signal with the anti-noise signal when output by the speaker.

12. A mobile device comprising the data transmitter of claim 7.

13. A method comprising:
regulating, with a switch, voltage from a direct-current (DC) power supply as supplied to a set of vibration motors comprising a first vibration motor and a second vibration motor; and
generating, with a microcontroller, a pulse width modulation (PWM) signal with which to drive the switch and regulate the voltage to the set of vibration motors in a sinusoidal manner, to generate data as symbols from vibrations that form a series of bits from the set of vibration motors, the symbols including first symbols from the first vibration motor that emanate along a first axis at a first frequency, and second symbols from the second vibration motor that emanate along a second axis at a second frequency, wherein the first axis is substantially orthogonal to the second axis.

14. The method of claim 13, wherein the switch is a NPN Darlington transistor, the method further comprising:
filtering, with a resistor-capacitor (RC) filter, the first symbols and the second symbols, to remove distortions from the symbols; and smoothing out spikes in the symbols using a fly-back diode, wherein the RC filter and the fly-back diode are coupled between the switch and the set of vibration motors.

15. The method of claim 13, wherein the set of vibration motors causes associated ringing vibrations when driven, the method further comprising controlling, by the microcontroller, the set of vibration motors to apply a small braking voltage a predetermined period of time after being driven to generate a symbol, wherein the predetermined period of time is sufficient for a demodulator of a data receiver to sample the symbol.

16. The method of claim 13, wherein the first frequency and the second frequency are non-resonant frequencies between 300 Hz and 800 Hz and are separated by at least 40 Hz to ensure non-overlapping sidebands.

17. The method of claim 13, further comprising:
filtering, using a first raised cosine filter of the microcontroller, a first carrier signal to carry the first symbols;
filtering, using a second raised cosine filter of the microcontroller, a second carrier signal to carry the second symbols;
modulating, using an amplitude shift keying (ASK) modulator of the microcontroller, the first carrier signal separately from the second carrier signal, to generate a modulated first carrier signal and a modulated second carrier signal; and
generating, by the microcontroller, the PWM signal for the modulated first carrier signal and the modulated second carrier, to generate the first symbols and the second symbols, respectively.

18. The method of claim 13, further comprising transmitting a pilot frequency in a pilot carrier signal from at least one of the first vibrator motor or the second vibrator motor, the pilot carrier signal being transmitted in parallel to the series of bits, to synchronize transmission and reception of the series of bits.

* * * * *